United States Patent [19]
Onodera et al.

[11] Patent Number: 4,951,189
[45] Date of Patent: Aug. 21, 1990

[54] SEQUENCE CONTROL SYSTEM AND METHOD

[75] Inventors: Masayuki Onodera, Isehara; Tatsuo Naito, Atsugi; Hisashi Kubota, Fujisawa; Takayuki Kawakami, Sagamihara; Takatoshi Ito; Kei Shimizu, both of Zama, all of Japan

[73] Assignee: Nissan Motor Company, Limited, Yokohama, Japan

[21] Appl. No.: 264,744

[22] Filed: Oct. 31, 1988

[30] Foreign Application Priority Data

Oct. 3, 1987 [JP] Japan ............................ 62-276721
Oct. 30, 1987 [JP] Japan ............................ 62-276720
Mar. 17, 1988 [JP] Japan ............................ 63-61820
Mar. 17, 1988 [JP] Japan ............................ 63-61819
Oct. 30, 1988 [JP] Japan ............................ 62-276722

[51] Int. Cl.$^5$ ..................... G06F 15/46; G05B 19/02
[52] U.S. Cl. ............................ 364/141; 364/900; 364/926.9; 364/949
[58] Field of Search ............. 364/140, 141, 146, 147, 364/136, 900, 949, 926.9

[56] References Cited

U.S. PATENT DOCUMENTS 4,486,830 12/1984 Taylor, Jr. et al. .............. 364/141
4,799,141 1/1989 Drusinsky et al. ............... 364/141

Primary Examiner—Joseph Ruggiero
Attorney, Agent, or Firm—Foley & Lardner, Schwartz, Jeffery, Schwaab, Mack, Blumenthal & Evans

[57] ABSTRACT

To facilitate program control modification and troubleshooting in a sequence control system in spite of simple processing programs, sequence control processes are linked in a chain fashion. A unit process for activating an actuation member in both forward and reverse directions forms a ring so as to be activated in sequence cyclically, and these unit process rings are linked between an actuation start side activator for the present process and an actuation end side activator for the preceding process, both activated simultaneously whenever one of them is activated. Therefore, any process can be stopped at, restarted and reversed from any process steps in both the forward and reverse directions through the linked actuation start and end side activators, after the automatic operation has been switched to the manual operation or vice versa.

13 Claims, 36 Drawing Sheets (Prior Art) FIG.1
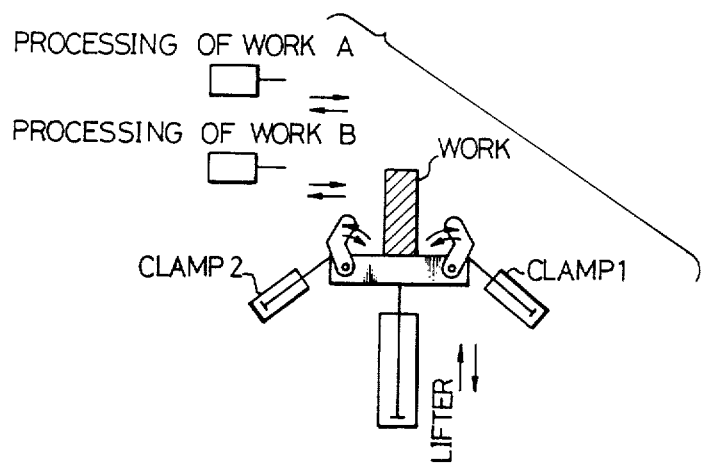
(Prior Art) FIG.1(A)
① LIFTER: UP
② CLAMP1: ON
CLAMP2: ON
③ IF WORK A; PROCESS A: FORWARD
IF WORK B; PROCESS B: FORWARD
④ PROCESS A,B: REVERSE
⑤ CLAMP1: AWAY
CLAMP2: AWAY
⑥ LIFTER: DOWN

LIFTER OPERATION FORM UPPER TO LOWER LIMIT

FIG.12(A)
(Prior Art)
FIG.12(B)
(Prior Art)
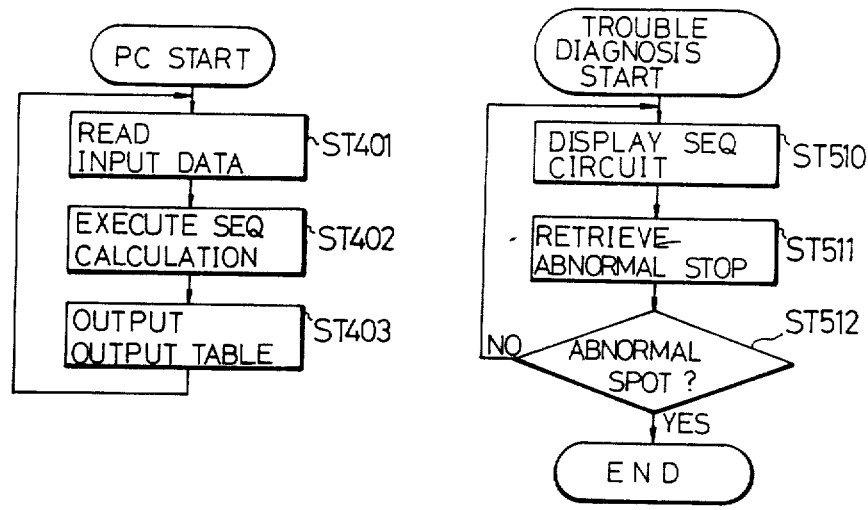
FIG.12(C)
(Prior Art)
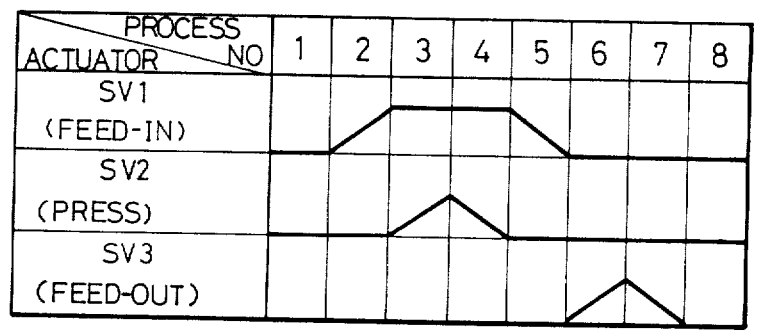

4,951,189

SEQUENCE CONTROL SYSTEM AND METHOD

BACKGROUND OF THE INVENTION

1. Field of the Invention

The present invention relates generally to a sequence control system and its method of controlling sequential operation of machine tools, for instance and more specifically to a sequence control system and its method which can facilitate operation modification and trouble repair, in particular.

2. Description of the Prior Art

Recently, programmable sequence control systems are widely adopted in order to control various industrial machines in various industrial fields. The reason why these sequence control systems have come into wide use is that any required system can be configured by forming user programs; machine operation can be simply modified to required motions by changing only programs; and further the system cost is relatively low.

In the sequence control system as described above, however, since the processing method is a relay ladder method, when adopted to a very large-scale industrial machine, there exist problems in that the programs for the sequence control system for controlling the industrial machine is huge and complicated and further it takes a lot of time whenever the programs are modified. For example, when some member becomes unmovable, conditions under which the member is moved is checked in sequence on the basis of ladder diagrams. However, if the conditions are huge, it takes much time to check and find out the causes of the trouble. This is because it is impossible to understand the operation only by looking at the ladder diagrams.

To overcome the above-mentioned drawbacks involved in relay ladder method, recently sequence control systems of a graph set processing method have been adopted. In the sequence control systems the graph set method, since processing steps can be entered in correspondence to the machine operation, when the machines are modified or repaired, the processing steps stored in the sequence control system are outputted to understand machine operation with reference to the outputted processing steps. Therefore, it is possible to repair or modify the machines more easily as compared with those of relay ladder method.

For instance, when a machine which functions as shown in FIGS. 1 and 1(A) is controlled by a sequence control system of graph set method, first, a timing chart as shown in FIG. 1(B) is formed, and processing steps as shown in FIG. 1(C) are inputted in correspondence to the timing chart.

That is, first Y1 is turned on to raise a lifter (in step 1). If the lifter is raised to an upper limit and therefore a transition condition X1 is on, Y1 is turned off and Y3 is turned on and simultaneously Y5 is turned on to move clamps 1 and 2 (in steps 2 and 3). Succeedingly, transition conditions X3 and X5 are turned on, and therefore transition conditions of workpiece A is turned on; that is, when the clamps 1 and 2 move to the forward end and also the workpiece is A, Y3 and Y5 are turned off simultaneously and Y7 is turned on (in step 4). When the workpiece A is processed in a predetermined process and therefore transition conditions X7 is turned on, Y7 is turned off and Y8 is turned on (in step 5). On the other hand, when conditions X3 and X5 are turned on and further transition condition of workpiece B is turned on; that is, when the clamps 1 and 2 move to a forward end and the workpiece is B, Y3 and Y5 are turned off simultaneously and Y9 is turned on (in step 6). When the workpiece B is processed and therefore the transition condition X9 is turned on, Y9 is turned off and Y10 is turned on (in step 7). Thereafter, when the workpiece A or B has been processed and therefore the transition conditions X8 and X10 are turned on, Y8 and Y10 are turned off and Y4 is turned on and simultaneously Y6 is turned on to return the clamps 1 and 2 (in steps 8 and 9). Further, when the clamps 1 and 2 are returned and therefore transition conditions X4 and X6 are turned on, Y4 and Y6 are turned off and Y2 is turned on to lower the lifter (in step 10). When the lifter is lowered to a lower limit and therefore transition condition X2 is turned on, Y2 is turned off (in step 11).

As described above, in the sequence control system of graph set method, since it is possible to directly input processing steps on the basis of the timing chart as shown in FIG. 1(B), the system can be modified or repaired relatively simply.

In the sequence control system of graph set method as described above, although there are many advantages as long as the machine is controlled automatically, in case trouble occurs with the machine and therefore some members are required to be moved manually, various problems develop.

For instance, in the flowchart shown in FIG. 1(C), in case the lifter will not rise to an upper limit due to some trouble, the step 1 is kept as it is indefinitely. Since it is impossible to repair the machine under these conditions, a step for forcedly stopping this processing is additionally required. In other words, it is necessary to switch the automatic operation to the manual operation to move the lifter manually. However, if the flowchart is previously formed together with the manual operation under consideration of trouble, since the manual operation flowchart must be added for each process, the flowcharts for covering the entire operation are very complicated, and therefore there exists a problem in that the advantages of graph set method can not be utilized in practice.

Further, even if elements of the machine can be moved by the above-mentioned manual operation, it is impossible to restart the machine by simply switching the manual operation to the automatic operation after repair or adjustment. This is because machine elements are kept stopped at positions determined when the automatic operation has been switched to the manual operation.

SUMMARY OF THE INVENTION

With these problems in mind, therefore, it is the primary object of the present invention to provide a sequence control system and method by which control operation can be modified simply and further trouble can be repaired also simply in spite of simple processing programs.

To achieve the above-mentioned object, a sequence control system for controlling a plurality of processes in sequence, each process being achieved by actuating an actuation member in both forward and reverse directions, according to the present invention, comprises: (a) forward side executing means for executing a forward process by driving at least one actuation member in the forward direction; (b) forward side actuating means for actuating said forward side executing means; (c) forward side stopping means for stopping said forward side executing means; (d) reverse side executing means for executing a reverse process by driving the at least one actuation member in the reverse direction; (e) reverse side actuating means for actuating said reverse side executing means; (f) reverse side stopping means for stopping said reverse side executing means; (g) actuation start side activating means, coupled to said forward side actuating means and said reverse side stopping means and activated when said reverse side stopping means is turned on, for allowing said forward side executing means to be activated when said forward side actuating means is turned on; and (h) actuation end side activating means, coupled to said forward side stopping means and said reverse side actuating means and activated when said forward side stopping means is turned on, for allowing said reverse side executing means to be activated when said reverse side actuating means is turned on, said actuation start side activating means for the present process and said actuation end side activating means for the preceding process being activated simultaneously when one of both is activated.

Further, to achieve the above-mentioned object, a sequence control method, according to the present invention, comprises the steps of: (a) checking whether actuation start side activating means for the present process is activated; (b) if activated, activating actuation end side activating means for the preceding process; (c) checking again whether the actuation start side activating means for the present process is activated; (d) if not activated, ending control; (e) if activated, checking whether forward side executing means can be activated; (f) if cannot be activated, repeating the above steps (c) to (e); (g) if can be activated, inactivating actuation end side activating means for the preceding process; (h) inactivating the actuation start side activating means for the present process; (i) executing forward side executing means; (j) checking whether the forward side executing mean can be stopped; (k) if cannot be stopped, repeating the above steps (i) and (j); and (l) if can be stopped, activating actuation end side activating means for the present process and actuation start side activating means for the succeeding process, simultaneously.

In the sequence control system according to the present invention, a number of sequential control processes are linked in a chain fashion. A unit process for activating an actuation member in both forward and reverse directions forms a ring so as to be activated in sequence cyclically, and these unit process rings are linked between the actuation start side activating means for the present process and the activation end side activating means for the preceding process (which are both activated simultaneously whenever one of them is activated). Therefore, it is possible to stop, restart, reverse from any process steps in both the forward and reverse directions through the linked actuation start and end side activating means, after the automatic operation has been switched to the manual operation or vice versa.

In practice, when a preceding process has been completed (e.g. a workpiece is lifted by a lifter), the actuation end side activating means for the preceding process (e.g. relay switch) and the actuation start side activating means for the present process (e.g. relay switch) are both activated. Under these conditions, when the forward side actuating means (e.g. relay switch) is turned on, the forward side execution means (e.g. valve to drive a cylinder) is activated to execute a predetermined process (e.g. the lifted workpiece is clamped). When the forward side stopping means (e.g. limit switch) is turned on, the forward side execution means is deactivated and the actuation end side activating means (e.g. relay switch) is activated for standing-by the succeeding process (e.g. the clamped workpiece is processed).

In case of trouble, the reverse side actuating means (e.g. a pushbutton switch) is turned on to activate the reverse side execution means (e.g. a valve to reverse the cylinder). When the reverse side stopping means (e.g. limit switch) is turned on, the reverse side execution means is deactivated (e.g. the clamped workpiece is released) and the actuation start side activating means (e.g. relay switch) is activated. Simultaneously, since the actuation end side activating means (e.g. relay switch) for the preceding process is also activated, it is possible to further reverse the process. (e.g. the workpiece can be lowered by the lifter) where necessary.

BRIEF DESCRIPTION OF THE DRAWINGS

FIGS. 1 and 1(A) are illustrations for assistance in explaining a simple prior-art machine operation;

FIG. 12(A) and (B); are flowcharts for assistance in explaining the prior art diagnosis method;

FIG. 12(C) is a timing chart for assistance in explaining a prior-art sequential control system for controlling the machine shown in FIG. 11;

DETAILED DESCRIPTION OF THE PREFERRED EMBODIMENTS

Embodiments of the sequence control system and its method according to the present invention will be described hereinbelow with reference to the attached drawings.

Figure 2:
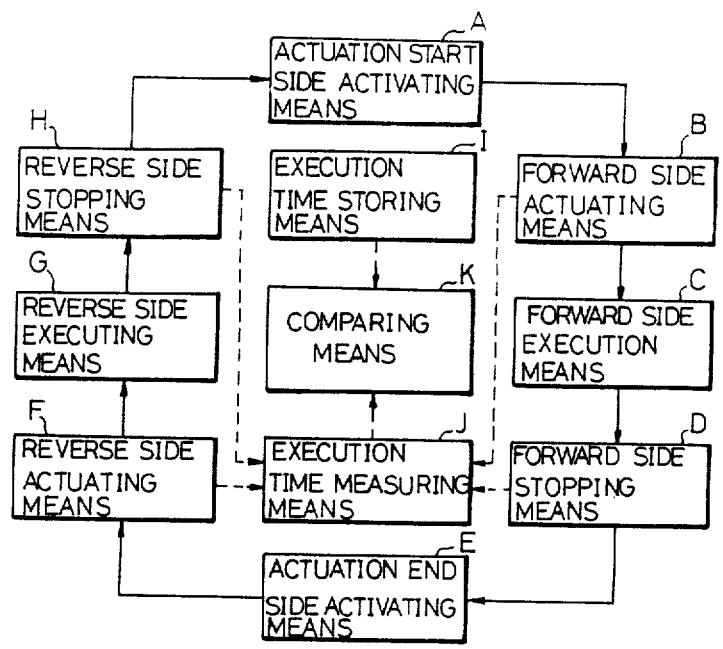
FIG. 2 is a basic conceptual block diagram showing a sequence control system of the present invention.

FIG. 2 is a conceptual diagram of the system of the present invention, which comprises: (a) forward side executing means C for executing a forward process by driving at least one actuation member in the forward direction; (b) forward side actuating means B for actuating said forward side executing means; (c) forward side stopping means D for stopping said forward side executing means; (d) reverse side executing means G for executing a reverse process by driving the at least one actuation member in the reverse direction; (e) reverse side actuating means F for actuating said reverse side executing means; (f) reverse side stopping means H for stopping said reverse side executing means; (g) actuation start side activating means A, coupled to said forward side actuating means and said reverse side stopping means and activated when said reverse side stopping means is turned on, for allowing said forward side executing means to be activated when said forward side actuating means is turned on; and (h) actuation end side activating means E, coupled to said forward side stopping means and said reverse side actuating means and activated when said forward side stopping means is turned on, for allowing said reverse side executing means to be activated when said reverse side actuating means is turned on, said actuation start side activating means for the present process and said actuation end side activating means for the preceding process being activated simultaneously when one of both is activated.

The system shown in FIG.2 operates as follows: when the actuation start side activating means A is activated and the forward side actuating means B is turned on, the actuation start side activating means A is inactivated, and further the forward side executing means C operates an actuation member in the forward stepping direction in a predetermined sequence. Succeedingly, when the forward side stopping means D is turned on, the actuation end side activating means E is activated and simultaneously the actuation start side activating means A for the succeeding step is activated. Under these conditions, the reverse side actuating means F is turned on, the actuation end side activating means E is inactivated and further the reverse side executing means G operates the actuation member in a direction opposite to the forward stepping direction in a predetermined sequence. Further, when the reverse side stopping means H is turned on, the actuation start side activating means A is activated and further the actuation end side activating means E for the preceding step is activated.

Therefore, the operating member can be operated in the forward stepping direction or the opposite direction for each step. Further, even when the manual operation is switched to the automatic operation, it is possible to automatically start to actuate the actuation member from any step. Further, since the processing step program can be simplified, it is possible to quickly modify work processing steps and repair trouble.

The feature of the system shown in FIG. 2 is to simultaneously activate the actuation end side activating means E for the present step and the actuation start side activating means A for the succeeding step. Therefore, under the forward operation, the processing steps can be executed in the order of A0, B0, C0, D0 and E0 (0 indicates the present process) and A1, B1, C1, D1 and E1 (1 indicates the succeeding process) and so on step by step. On the other hand, under the reverse operation, the processing steps can be executed in the reverse order of E0, F0, G0, H0 and A0 (0 indicates the present process) and E1', F1', G1', H1' and A1' (1' indicates the preceding process) and so on step by step.

The actuation start and end side activating means A and E are relay switches; the forward and reverse side execution means C and G are solenoids, valves, etc.; and the forward and reverse side actuating and stopping means B, D, F and H are limit switches, relay contacts, pushbutton switches, etc., for instance.

Figure 3:
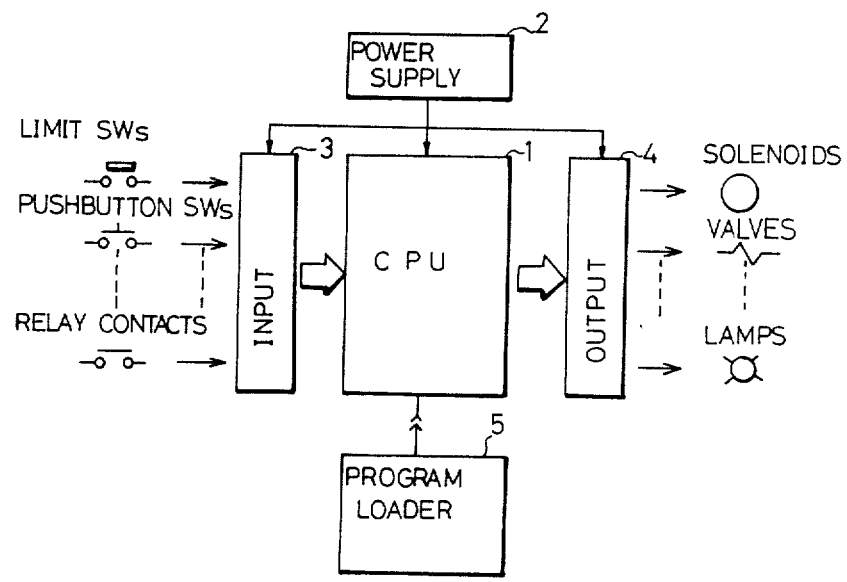
FIG. 3 is a block diagram showing the sequence control system of the present invention.

FIG. 3 is a block diagram of a sequence control system of according to the present invention.

In the drawing, a power supply section 2, an input section 3 and an output section 4 are connected to a CPU 1 provided with a calculation control section and a memory section. To this input section 3, various switches such as limit switches, pushbutton switches, relay contacts are connected to enter various contact information. To the output section 4, electromagnetic switches, electromagnetic valves, pilot lamps are connected to activate these devices in accordance with instructions from the CPU 1.

A program loader 5 for inputting programs is connected to the CPU 1 where necessary. Therefore, when a new program is entered into the CPU 1 or modified, the program is added or modified through this program loader 5.

Figure 1B:
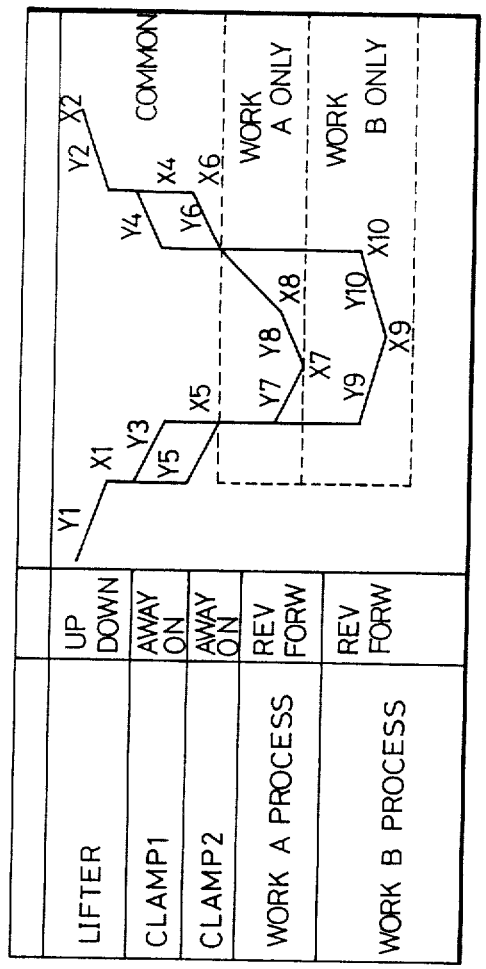
FIG. 1(B) is a timing chart for assistance in explaining a prior-art graph-set sequence control system for controlling the machine shown in FIGS. 1 and 1(A)
Figure 1C:
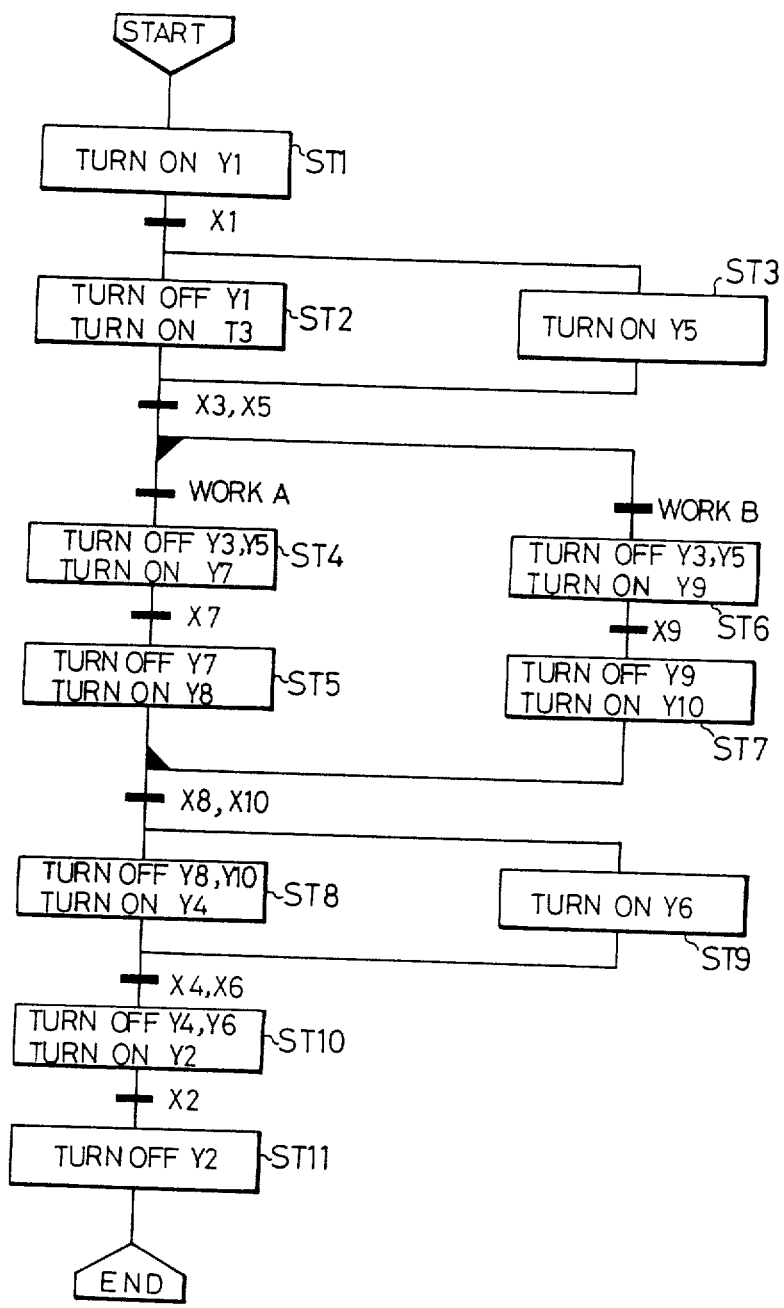
FIG. 1(C) is a flowchart for assistance in explaining the operation of the machine shown in FIGS. 1 and 1(A) in accordance with a timing chart shown in FIG. 1(B)
Figure 4A:
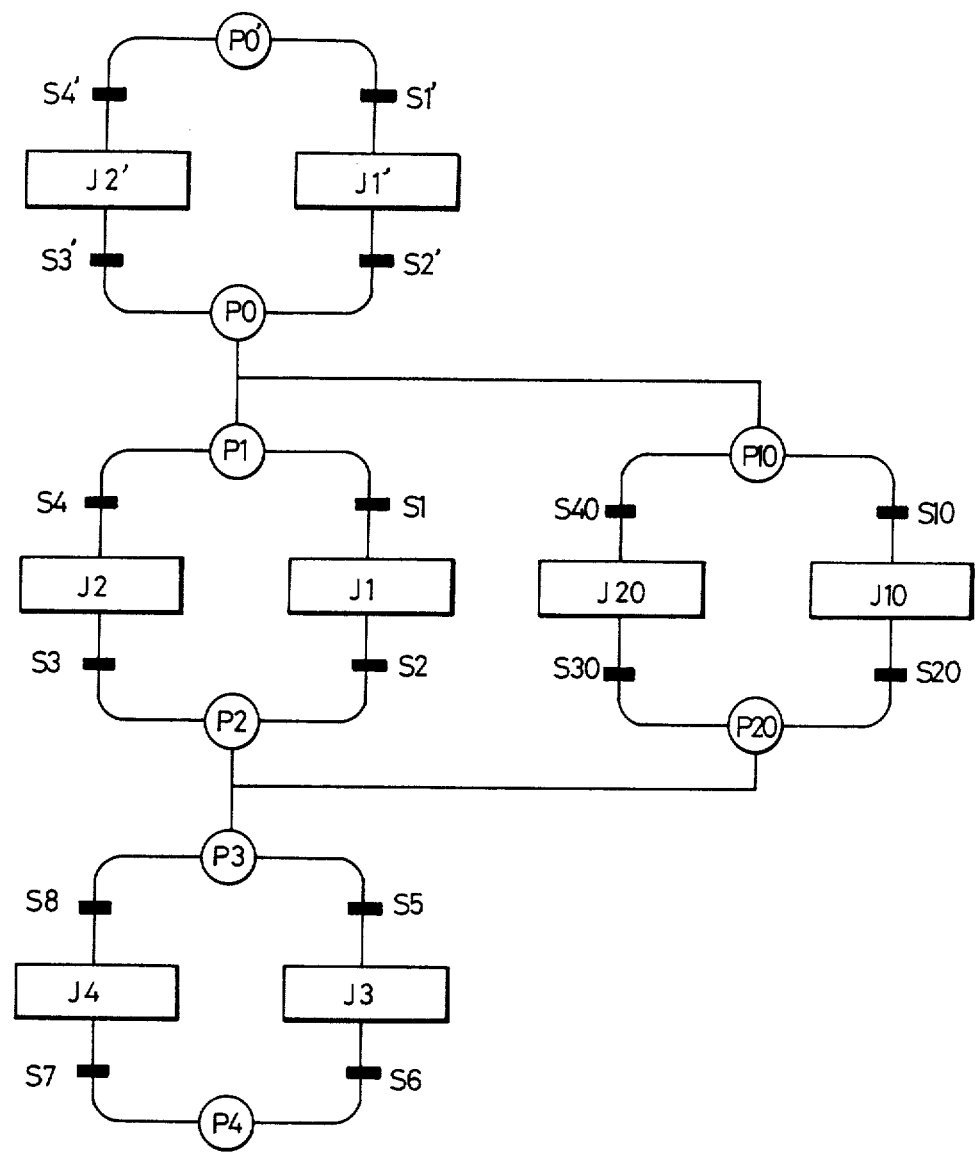
FIG. 4(A) and (B) are conceptual diagrams showing some processing examples of the sequence control method of the present invention.
Figure 4:
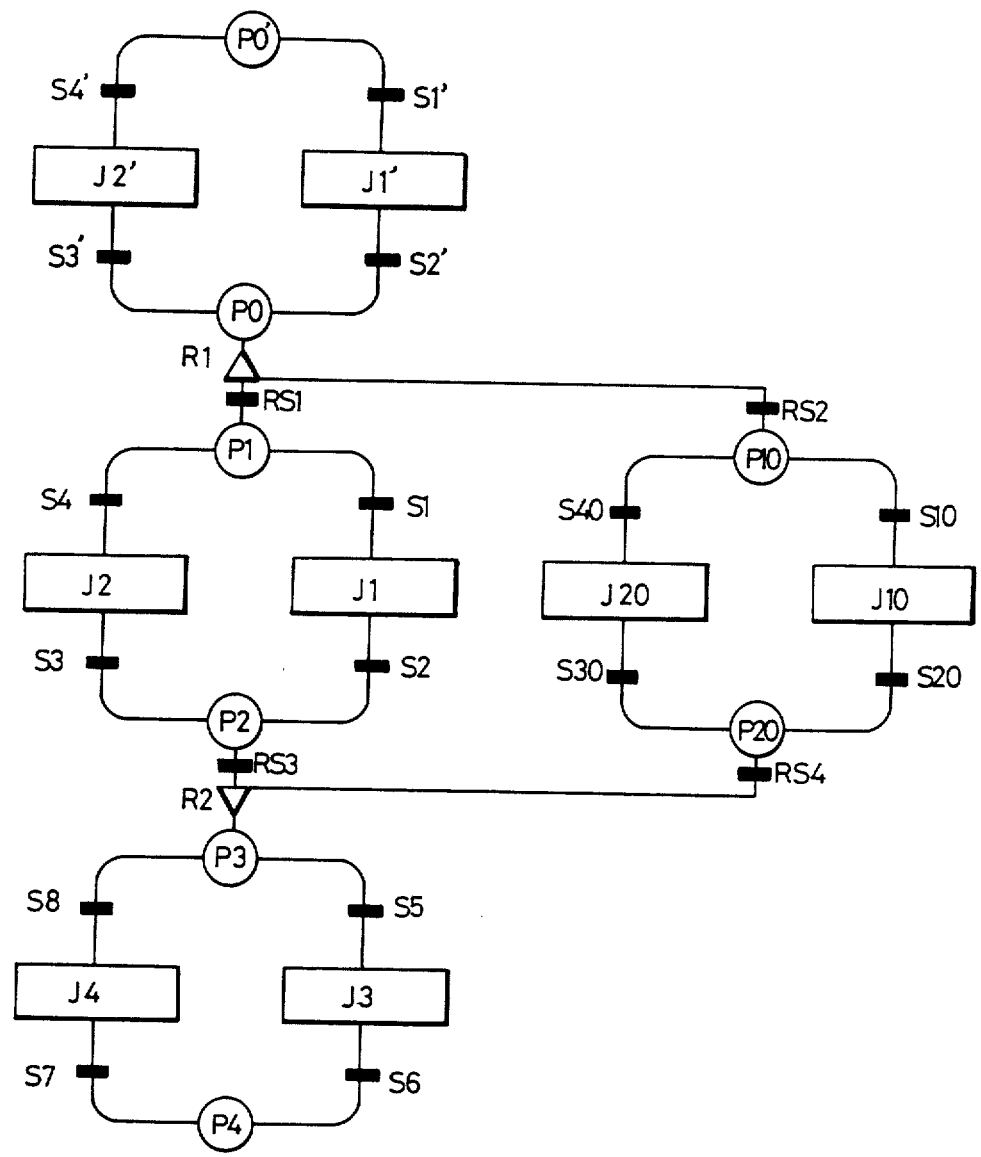

FIGS. 4(A) and 4(B) are conceptual diagrams showing a method of operating the machine as shown in FIGS. 1, 1(A) and 1(B) in accordance with a sequence control method according to the present invention.

In these conceptual diagrams of the processing method, P0', P1, P3 and P10 denote state points of the actuation start side activating means; P0, P2, P4 and P20 denote state points of the actuation end side activating means; S1', S1, S5 and S10 denote transition conditions of the forward side actuating means; S2', S2, S6 and S20 denote transition conditions of the forward side stopping means; S3', S3, S7 and S30 denote transition conditions of the reverse side actuating means; S4', S4, S8 and S40 denote transition conditions of the reverse side stopping means; J1', J1, J3, and J10 denote execution instruction group of the forward side executing means; J2', J2, J4, and J20 denote execution instruction group of the reverse side executing means; R1 and R2 denote route selection and route confluence; and RS1, RS2, RS3 and RS4 denote route selection conditions.

Figure 5:
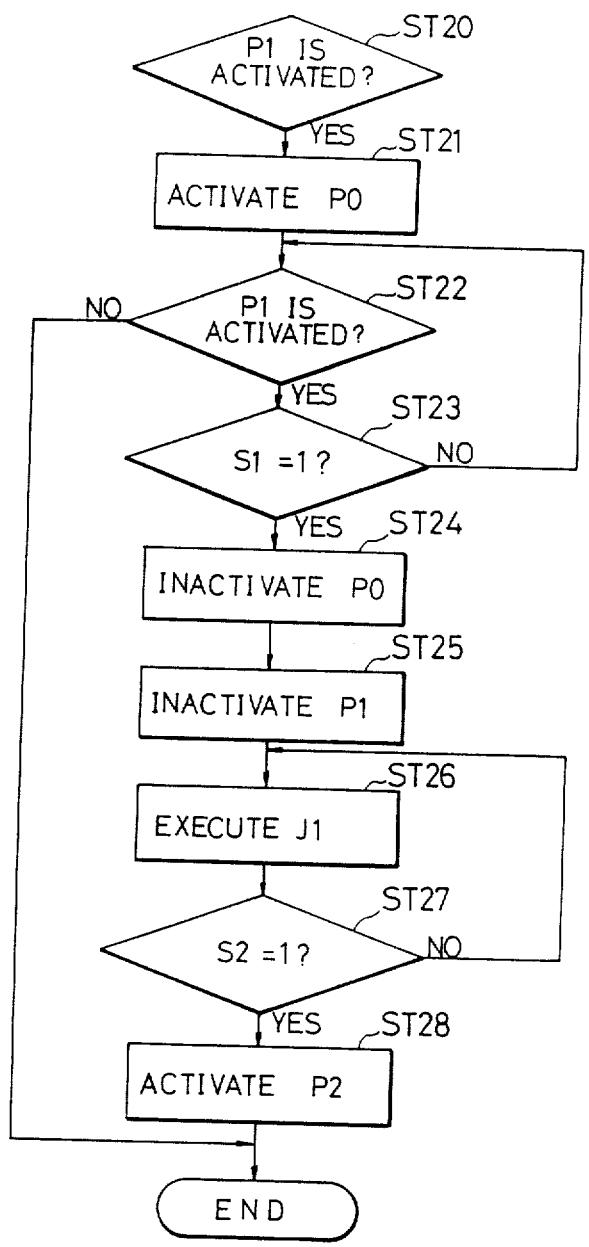
FIG. 5(A) to 5(C) are flowcharts for assistance in explaining the basic operation of the sequence control method of the present invention.
Figure 5:
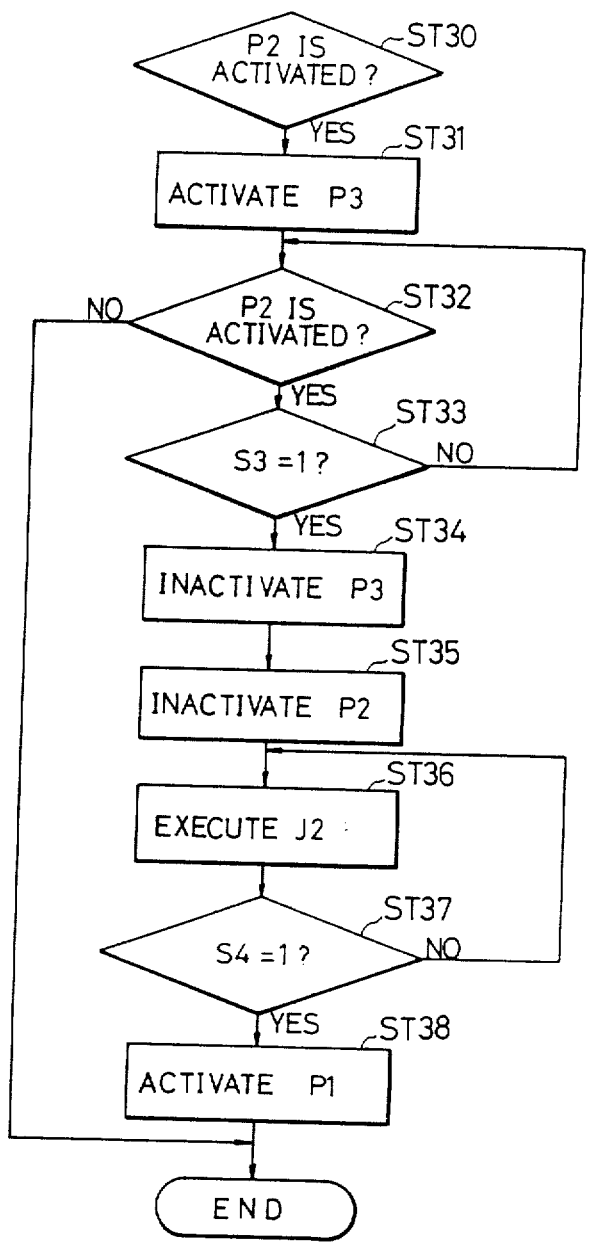
Figure 5:
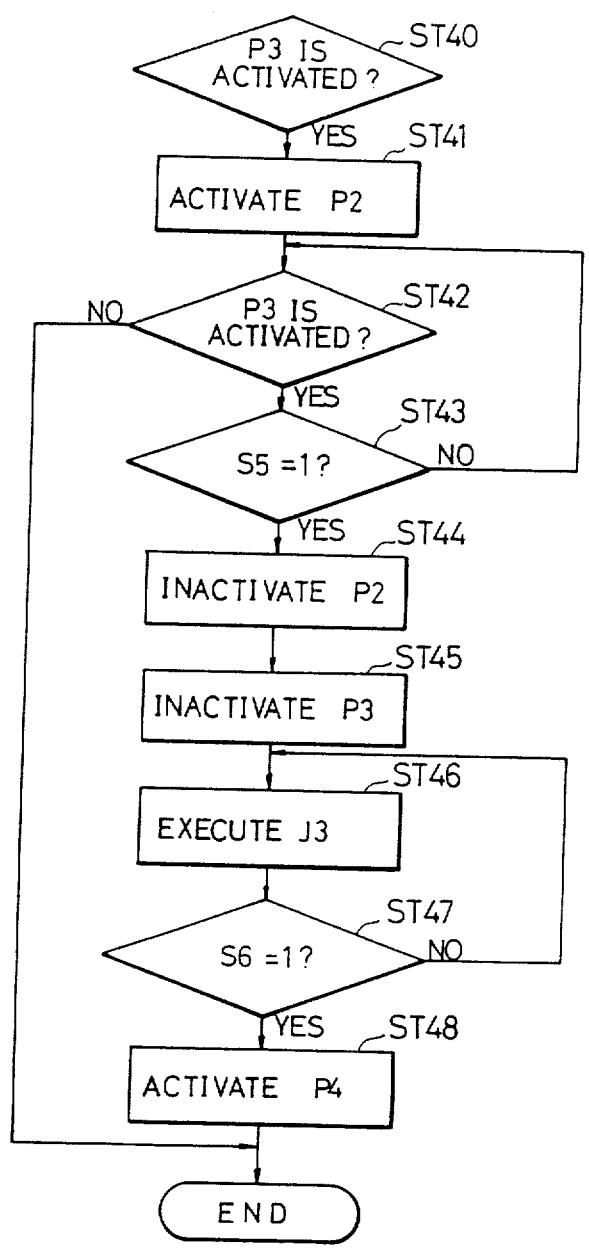

Each system element shown in the conceptual diagram of FIGS. 4(A) and 4(B) operates on the basis of the basic flowcharts shown in FIGS. 5(A) to 5(C) as follows (in the flowcharts, steps are referred to as ST, simply):

When the CPU for controlling the whole operation of the sequence control system determines that the state point P1 is active (in step 20), CPU activates the state point P0 (in step 21). CPU determines whether the state point P1 is active again (in step 22). If not active, control ends; if active, CPU determines whether the transition condition S1 is 1; that is, CPU checks whether condition under which an execution instruction group J1 can be executed is satisfied (in step 23). If S1 is not 1, CPU repeats the processes of steps 22 and 23; if S1 is 1, CPU inactivates the state points P0 and P1 to execute the execution instruction group J1 (in steps 24, 25, 26). Thereafter, CPU determines whether the transition condition S2 is 1; that is, the condition under which an execution instruction group J1 can be ended is satisfied (in step 27). If S2 is not 1, CPU repeats the steps 26 and 27 to continuously execute the execution instruction group J1; if S2 is 1, CPU activates the state point P2 (in step 28) to complete the process.

Further, when CPU determines that the state point P2 is active (in step 30), CPU activates the state point P3 (in step 31). Further, CPU determines whether the state point P2 is active again (in step 32). If not active, control ends; if active, CPU determines whether the transition condition S3 is 1; that is, CPU checks whether the condition under which an execution instruction group J2 can be executed is satisfied (in step 23). If S3 is not 1, CPU repeats the processes of steps 32 and 33; if S3 is 1, CPU inactivates the state points P3 and P2 to execute the execution instruction group J2 (in steps 34, 35 36). Thereafter, CPU checks whether the condition S4 is 1; that is, CPU checks whether the condition under which the execution instruction group J2 can be ended is satisfied (in step 37). If S4 is not 1, CPU repeats the processes of steps 36 and 37 to continuously execute the execution instruction group J2; if S4 is 1, CPU activates the state point P1 (in step 38) to complete the process.

Further, when CPU determines that the state point P3 is active (in step 40), CPU activates the state point P2 (in step 41). CPU checks whether the state point P3 is active again (in step 42). If not active, control ends. If active, CPU determines whether the transition condition S5 is 1; that is, CPU checks the condition under which an execution instruction group J3 can be executed is satisfied (in step 43). If S5 is not 1, CPU repeats the processes of steps 42 and 43; if S5 is 1, CPU inactivates the state points P2 and P3 to execute the execution instruction group J3 (in steps 44, 45, 46). Thereafter, CPU determines whether the transition condition S6 is 1; that is, CPU checks whether the condition under which the execution instruction group J3 can be ended is satisfied (in step 47). If S6 is not 1, CPU repeats the processes of steps 46 and 47 to continuously execute the execution instruction group J3; if S6 is 1, CPU activates the state point P4 (in step 48) to complete the process. Each system component operates as described above to effect processing step by step.

Figure 6:
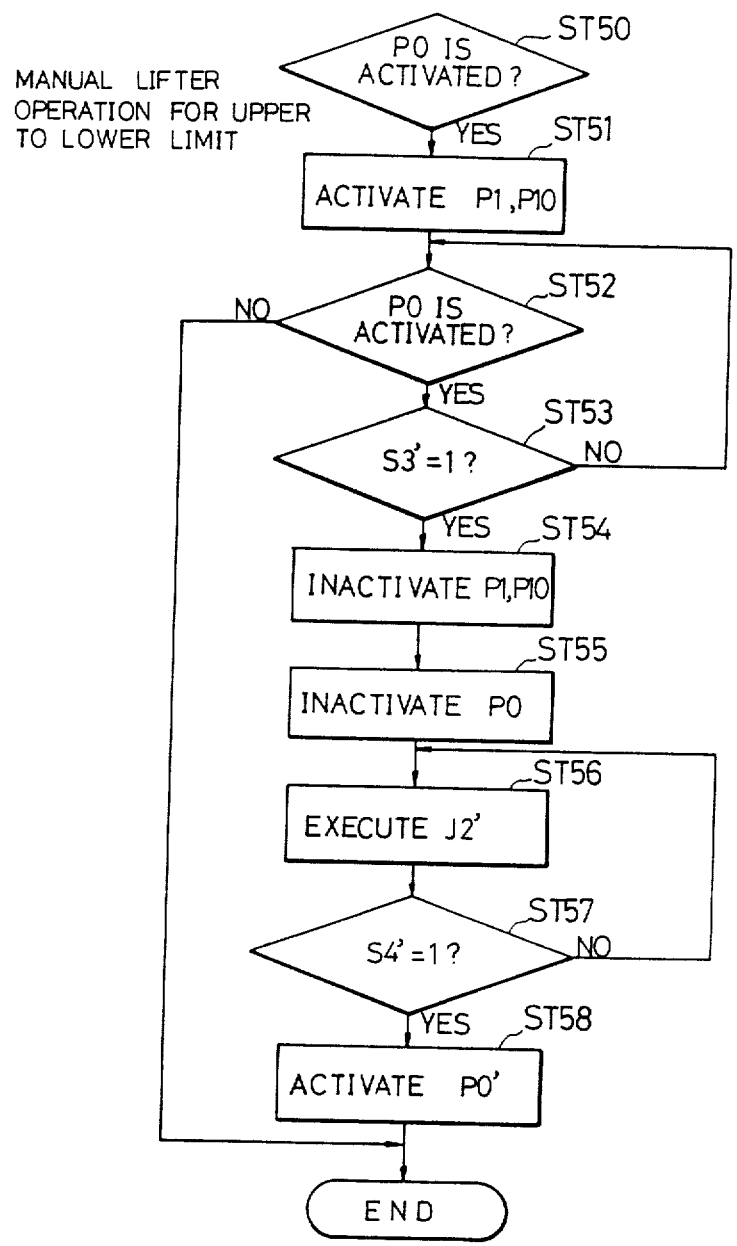
FIG. 6(A) to 6(N) are flowcharts for assistance in explaining the operation of some examples of the sequence control methods of the present invention shown in FIGS. 4(A) and (B)
Figure 6:
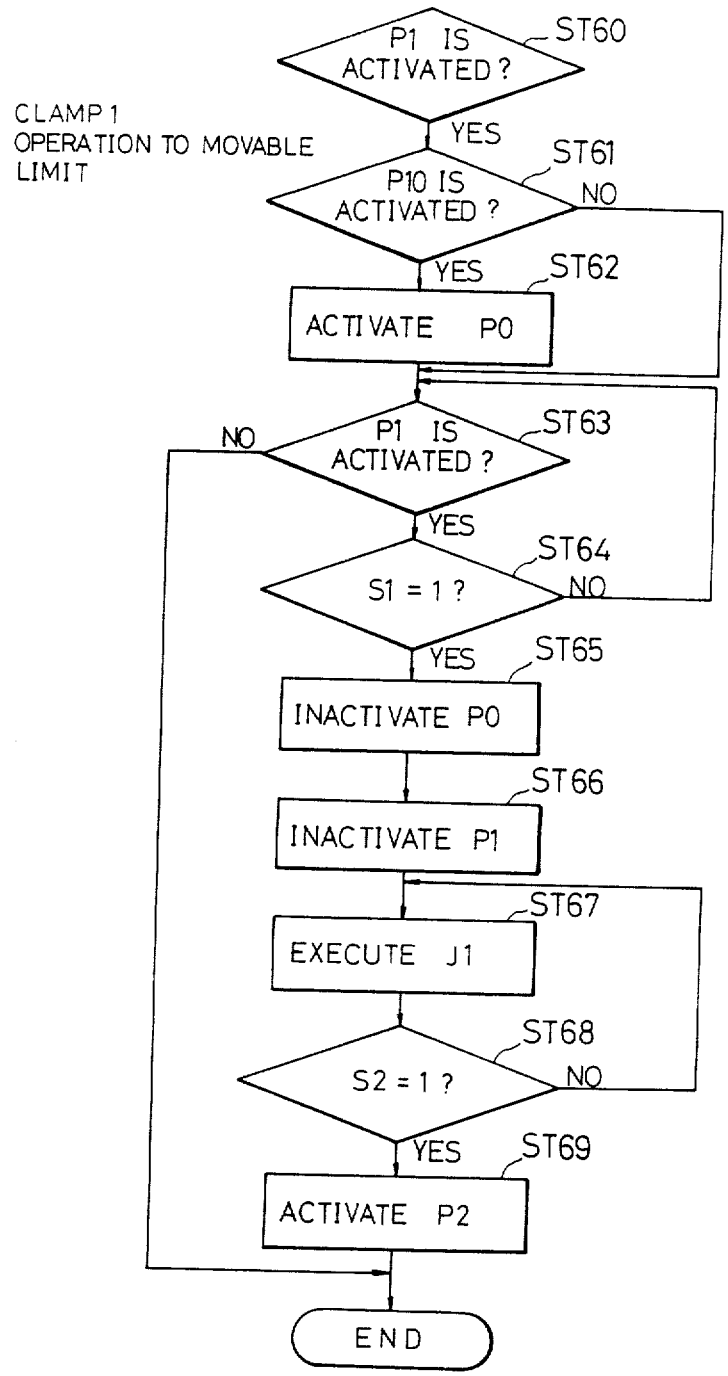
Figure 6:
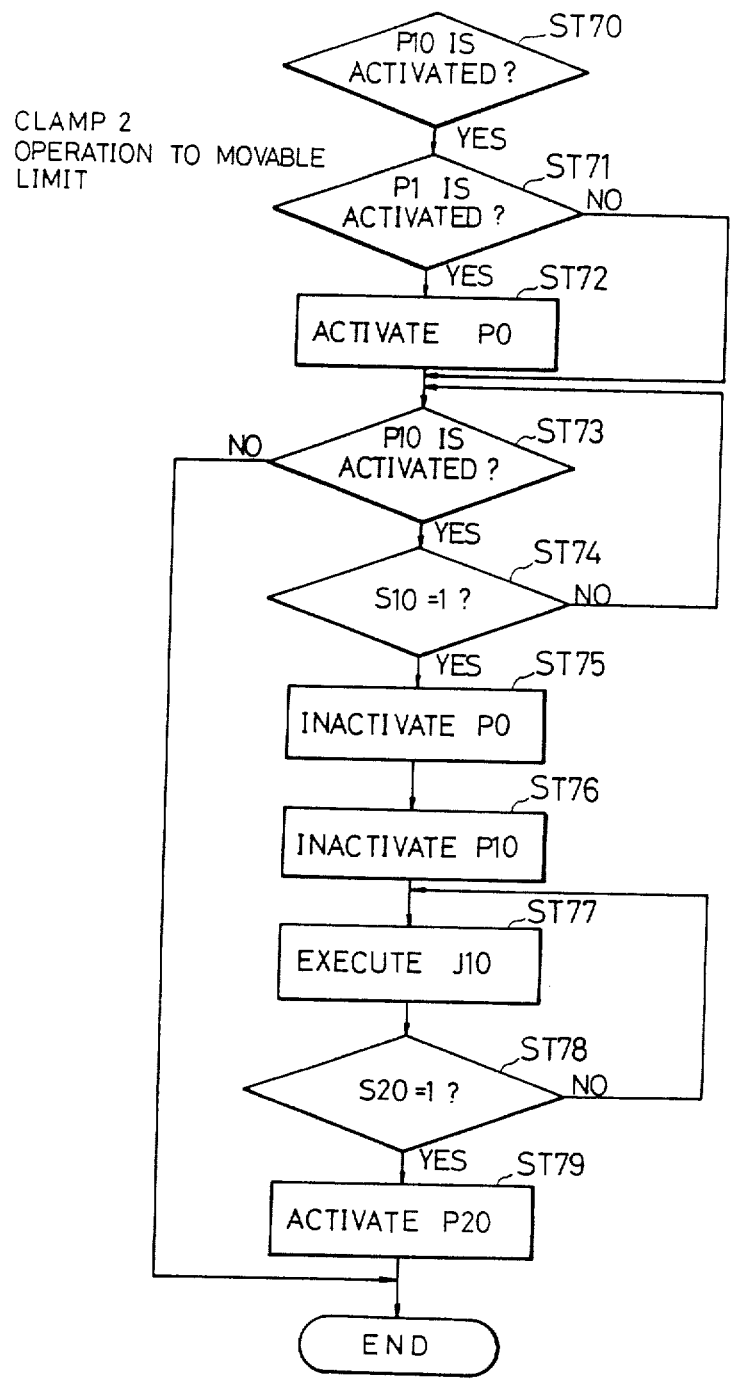

FIGS. 6(A) to 6(N) show operation flowcharts for controlling the machine as shown in FIGS. 1, 1(A) and 1(B) by use of the sequence control system based upon the sequence control method according to the present invention. These operation flowcharts will be explained with reference these drawings, by way of example.

As shown in FIG. 6(A), when the state point P0 is active; that is, the lifter shown in FIGS. 1 and 1(A) reaches an upper limit (in step 50), CPU activates the state points P1 and P0 (in step 51). CPU determines whether the state point P0 is active (in step 52). If not active, control ends; if active, CPU determines whether the transition condition S3' is 1; that is, the condition under which the execution instruction group J2' can be executed (in practice, the lifter can be moved from an upper limit to a lower limit) is satisfied. Further, this condition can be determined by turning on a manual pushbutton switch (in step 53). If S3' is not 1, CPU repeats the processes of steps 52 and 53 to execute the execution instruction group J2' immediately after the transition condition S3' is established.

If S3' is 1, CPU inactivates the state points P1, P10 and P0 to execute the execution instruction group J2'; that is, the lifter is moved from the upper limit to the lower limit (in steps 54, 55, 56). Thereafter, CPU determines whether the transition condition S4' is 1; that is, the condition under which the execution instruction group J2' can be ended is satisfied. Further, this condition can be set by turning off the manual pushbutton switch (in step 57). If S4' is not 1, CPU repeats the processes of steps 56 and 57 to continuously execute the execution instruction group J2'; that is, to move the lifter from the upper limit to the lower limit; if S4' is 1, CPU activates the state point P0' (in step 58) to complete the process.

In summary, this flowchart shows the processes to manually move the lifter from the upper limit to the lower limit. Further, when being executed, the execution instruction group J2' is interlocked with the execution instruction group J1;

Further, as shown in FIG. 6(B), when the state point P1 is active (in step 60), CPU determines whether the state point P10 is active; that is, the lifter moves to the upper limit (in step 61). If P10 is not active, CPU proceeds to step 63; if P10 is active, CPU activates the state point P0 (in step 62). CPU determines whether the state point P1 is active (in step 63). If not active, control ends. If active, CPU determines whether the transition condition S1 is 1; that is, CPU checks whether the condition under which the execution instruction group J1 can be executed is satisfied (in step 64). If S1 is not 1, CPU repeats the processes of steps 63 and 64 to execute the execution instruction group J1 immediately after the transition condition S1 is satisfied. If S1 is 1, CPU inactivates the state points P0 and P1 to execute the execution instruction group J1; that is, to move the clamp 1 (in steps 65, 66, 67). Thereafter, CPU determines whether the transition condition S2 is 1; that is, CPU checks whether the condition under which the execution instruction group J1 can be ended is satisfied (whether the clamp 1 is moved to the movable limit) (in step 68). If S2 is not 1, CPU repeats the processes of steps 67 and 68 to continuously execute the execution instruction group J1; that is, the clamp 1 is moved to the movable limit,; if S2 is 1; that is, the clamp 1 is moved to the movable limit, CPU activates the state point P2 (in step 69) to complete processing.

Further, as shown in FIG. 6(C) when the state point P10 is active (in step 70), CPU determines whether the state point P1 is active; that is, the lifter moves to the upper limit (in step 71). If P1 is not active, CPU proceeds to step 73; if P1 is active, CPU activates the state point P0 (in step 72). CPU determines whether the state point P10 is active (in step 73). If not active, control ends. If active, CPU determines whether the transition condition S10 is 1; that is, CPU checks whether the condition under which the execution instruction group J10 can be executed is satisfied (in step 74). If S10 is not 1, CPU repeats the processes of steps 73 and 74 to execute the execution instruction group J10 immediately after the transition condition S10 is satisfied. If S10 is 1, CPU inactivates the state points P0 and P10 to execute the execution instruction group J10; that is, to move the clamp 2 to the movable limit (in steps 75, 76, 77). Thereafter, CPU determines whether the transition condition S20 is 1; that is, CPU checks whether the condition under which the execution instruction group J20 can be ended is satisfied (whether the clamp 2 is moved to the movable limit) (in step 78). If S20 is not 1, CPU repeats the processes of steps 77 and 78 to continuously execute the execution instruction group J10; that is, the clamp 2 is moved to the movable limit,; if S20 is 1; that is, the clamp 2 is moved to the movable limit, CPU activates the state point P20 (in step 70) to complete processing.

As described above, the clamps 1 and 2 can be moved to the movable limit by executing the steps 60 to 79.

Figure 6D:
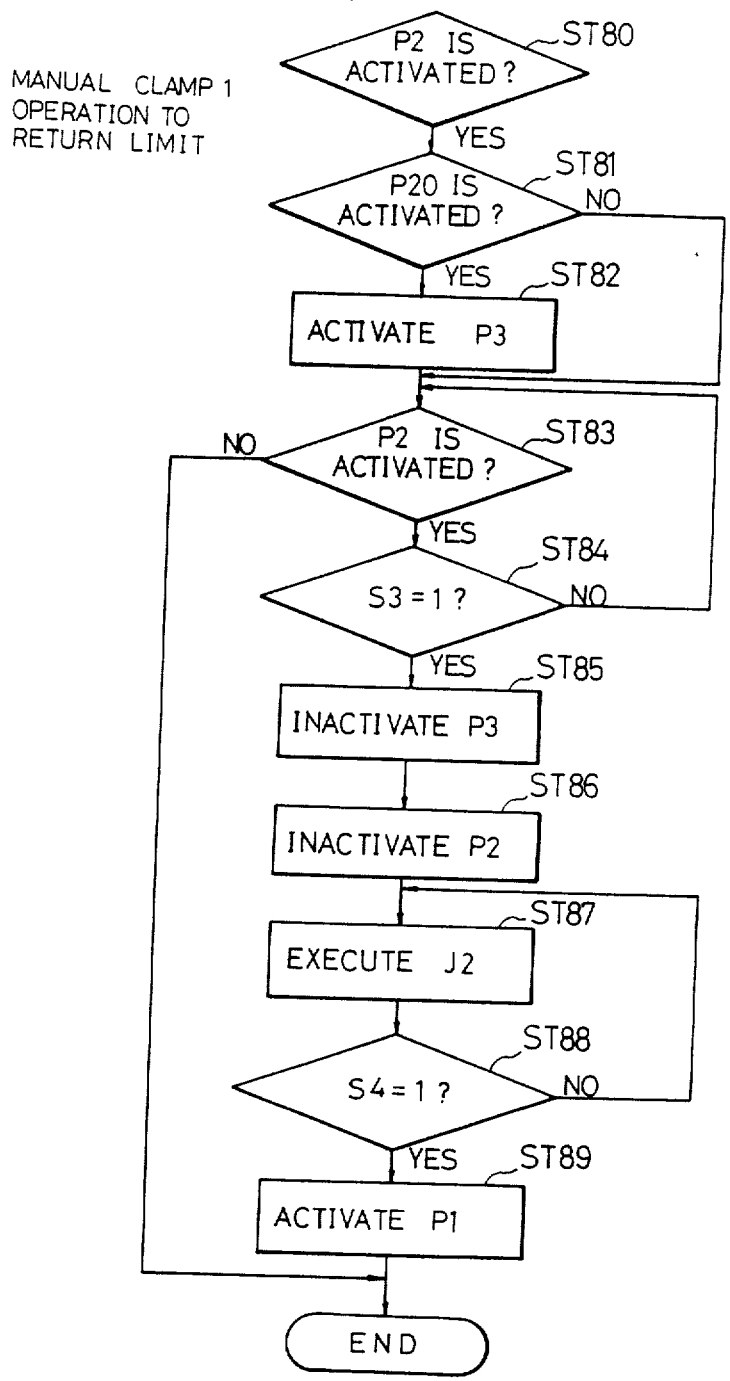

Further, as shown in FIG. 6(D), when the state point P2 is active (in step 80), CPU determines whether the state point P20 is active; that is, the clamp 2 moves to the movable limit (in step 81). If P20 is not active, CPU proceeds to step 83; if P20 is active, CPU activates the state point P3 (in step 82). CPU determines whether the state point P2 is active (in step 83). If not active, control ends. If active, CPU determines whether the transition condition S3 is 1; that is, CPU checks whether the condition under which the execution instruction group J2 can be executed is satisfied; that is, the clamp 1 can be moved from the movable limit to the return limit (in step 84). Further, this condition can be set by turning on the manual pushbutton switch. If S3 is not 1, CPU repeats the processes of steps 83 and 84 to execute the execution instruction group J2 immediately after the transition condition S3 is satisfied. If S3 is 1, CPU inactivates the state points P3 and P2 to execute the execution instruction group J2; that is, to return the clamp 1 (in steps 85, 86, 87). Thereafter, CPU determines whether the transition condition S4 is 1; that is, CPU checks whether the condition under which the execution instruction group J2 can be ended is satisfied (whether the clamp 1 is moved to the return limit) (in step 88). If S4 is not 1, CPU repeats the processes of steps 87 and 88 to continuously execute the execution instruction group J2; that is, the clamp 1 is moved to the return limit,; if S4 is 1; that is, the clamp 1 is moved to the return limit, CPU activates the state point P1 (in step 89) to complete processing.

Figure 6E:
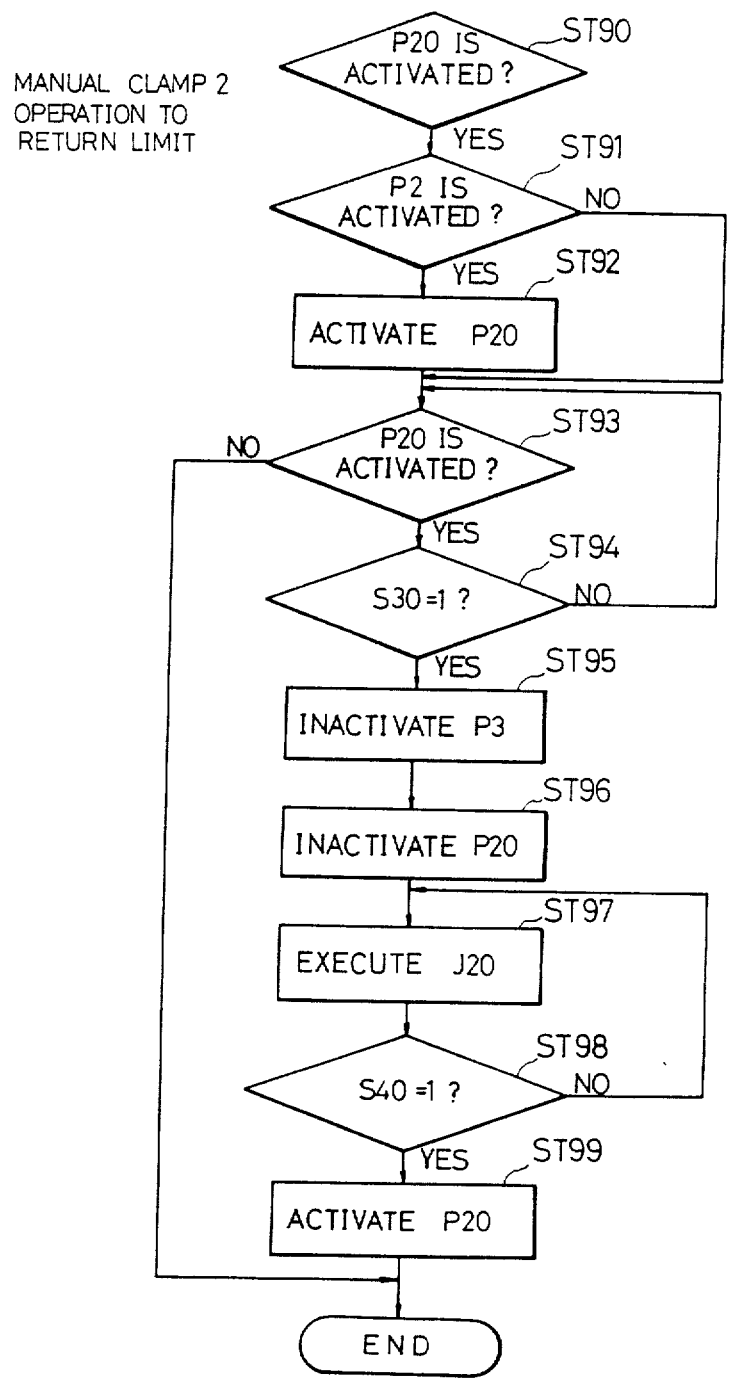

Further, as shown in FIG. 6(E), when the state point P20 is active (in step 90), CPU determines whether the state point P2 is active; that is, the clamp 1 moves to the movable limit (in step 91). If P2 is not active, CPU proceeds to step 93; if P2 is active, CPU activates the state point P3 (in step 92). CPU determines whether the state point P20 is active (in step 93). If not active, control ends. If active, CPU determines whether the transition condition S30 is 1; that is, CPU checks whether the condition under which the execution instruction group J20 can be executed is satisfied; that is, the clamp 2 can be moved from the movable limit to the return limit (in step 94). Further, this condition can be set by turning on the manual pushbutton switch. If S30 is not 1, CPU repeats the processes of steps 93 and 94 to execute the execution instruction group J20 immediately after the transition condition S30 is satisfied. If S30 is 1, CPU inactivates the state points P3 and P20 to execute the execution instruction group J20; that is, to return the clamp 2 to the return limit (in steps 95, 96, 97). Thereafter, CPU determines whether the transition condition S40 is 1; that is, CPU checks whether the condition under which the execution instruction group J20 can be ended is satisfied (whether the clamp 2 is moved to the return limit) (in step 98). If S40 is not 1, CPU repeats the processes of steps 97 and 98 to continuously execute the execution instruction group J20; that is, the clamp 2 is moved to the return limit,; if S40 is 1; that is, the clamp 2 is moved to the return limit, CPU activates the state point P10 (in step 99) to complete processing. As described above, the clamps 1 and 2 can be moved to the return limit by executing the steps 80 to 99 manually.

Figure 6F:
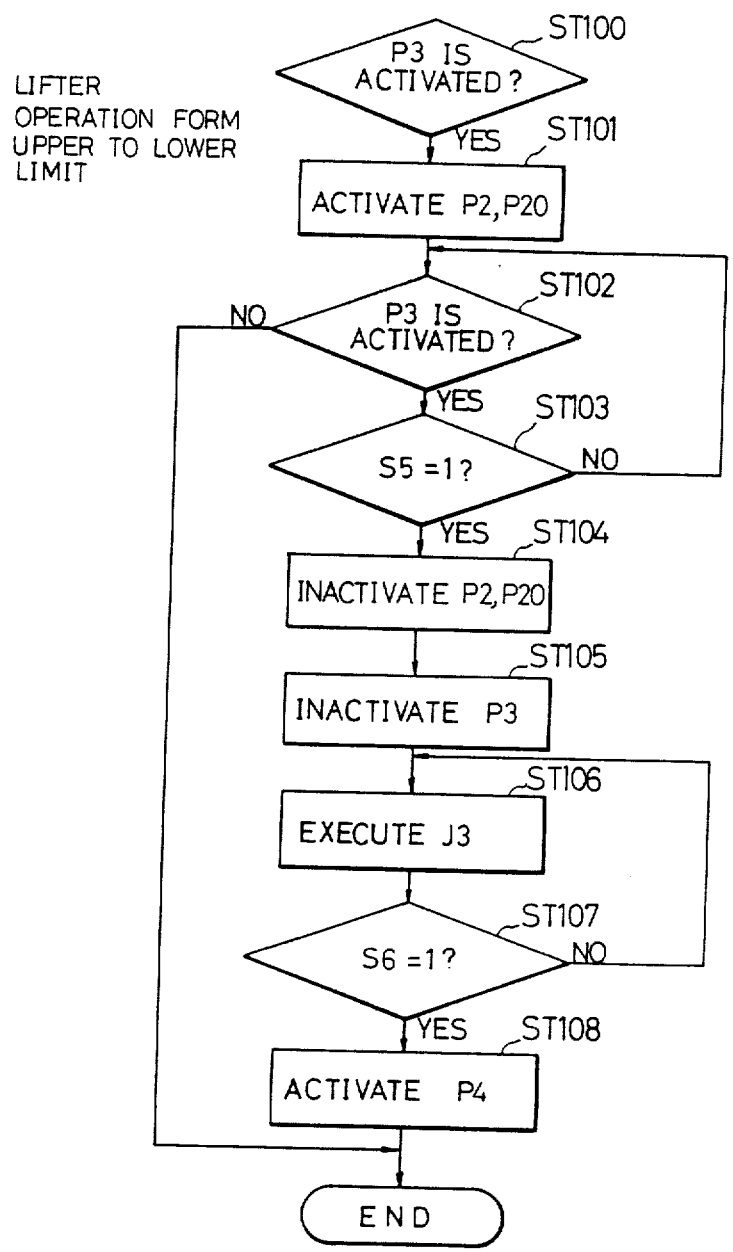

Further, as shown in FIG. 6(F), when the state point P3 is active (in step 100), CPU activates the state points P2 and P20 (in step 101). CPU determines whether the state point P3 is active (in step 102). If not active, control ends; if active, CPU determines whether the transition condition S5 is 1; that is, the condition under which the execution instruction group J3 can be executed (in practice, the lifter can te moved from the lower limit to the upper limit) (in step 103). If S5 is not 1, CPU repeats the processes of steps 102 and 103.

If S5 is 1, CPU inactivates the state points P2, P20 and P3 to execute the execution instruction group J3; that is, the lifter is moved from the lower limit to the upper limit (in steps 104, 105, 106). Thereafter, CPU determines whether the transition condition S6 is 1; that is, the condition under which the execution of the execution instruction group J3 can be ended is satisfied. (in step 107). If S6 is not 1, CPU repeats the processes of steps 106 and 107 to continuously execute the execution instruction group J3; if S6 is 1, CPU activates the state point P4 (in step 108) to complete the process.

The above-mentioned flowchart shown in FIGS. 6(A) to 6(F) have been described with reference to the conceptual diagram shown in FIG. 4(A) in which no route selection R and no route confluence RS are included.

However, the flowcharts shown in FIGS. 6(G) to 6(N) will be described with reference to the conceptual diagram shown in FIG. 4(B) in which some route selections R and some route confluences RS are included.

Figure 6G:
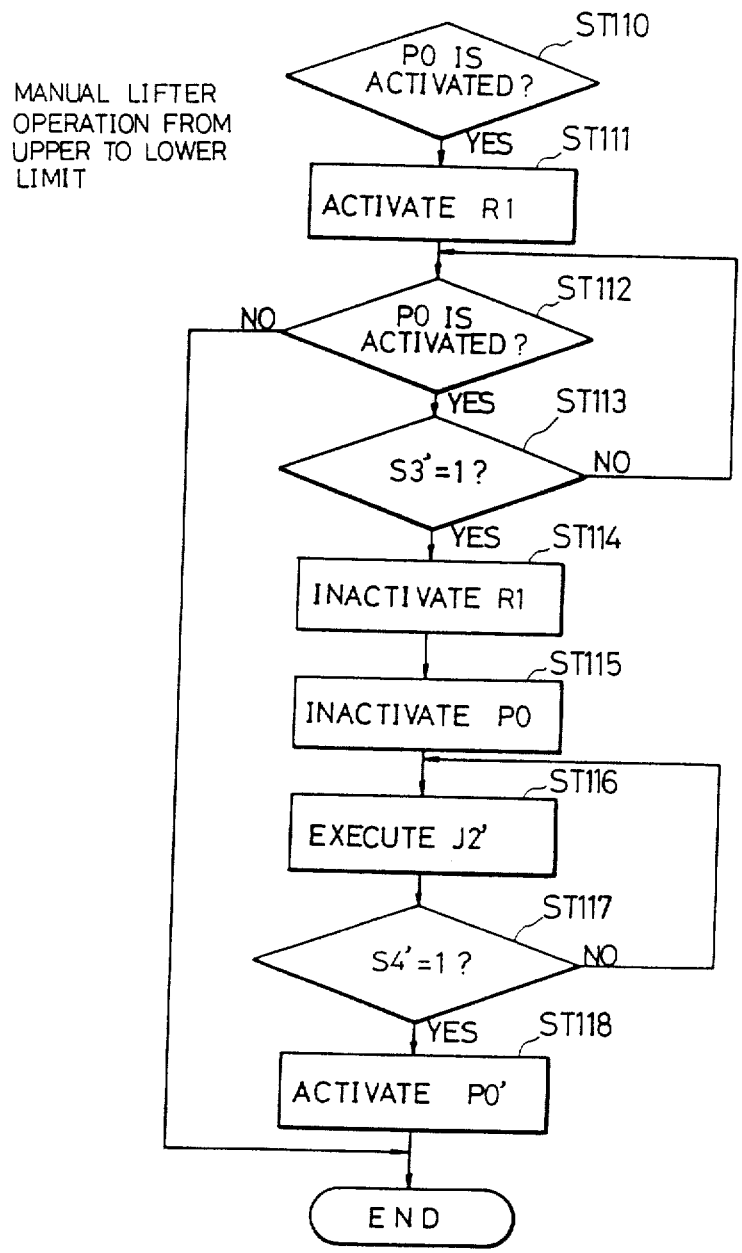

As shown in FIG. 6(G), when the state point P0 is active; that is, the lifter shown in FIGS. 1 and 1(A) reaches the upper limit (in step 110), CPU activates the R1 indicative of the route selection and confluence (in step 111). CPU determines whether the state point P0 is active (in step 112). If not active, control ends; if active, CPU determines whether the transition condition S3' is 1; that is, the condition under which the execution instruction group J2' can be executed (in practice, the lifter can be moved from an upper limit to a lower limit is satisfied. Further, this condition can be determined by turning on a manual pushbutton switch (in step 113). If S3' is not 1, CPU repeats the processes of steps 112 and 113 to execute the execution instruction group J2' immediately after the transition condition S3' is established.

If S3' is 1, CPU inactivates the state points P0, and R1 indicative of the route selection and confluence to execute the execution instruction group J2'; that is, to move the lifter from the upper limit to the lower limit (in steps 114, 115, 116). Thereafter, CPU determines whether transition condition S4' is 1; that is, the condition under which the execution instruction group J2' can be ended is satisfied. Further, this condition can be set by turning off the manual pushbutton switch (in step 117). If S4' is not 1, CPU repeats the processes of steps 116 and 117 to continuously execute the execution instruction group J2'; that is, to move the lifter from the upper limit to the lower limit; if S4' is 1, CPU activates the state point P0' (in step 118) to complete the process.

That is, this flowchart shows the process to manually move the lifter from the upper limit to the lower limit. Further, when being executed, the execution instruction group J2' is interlocked with the execution instruction group J1.

Figure 6H:
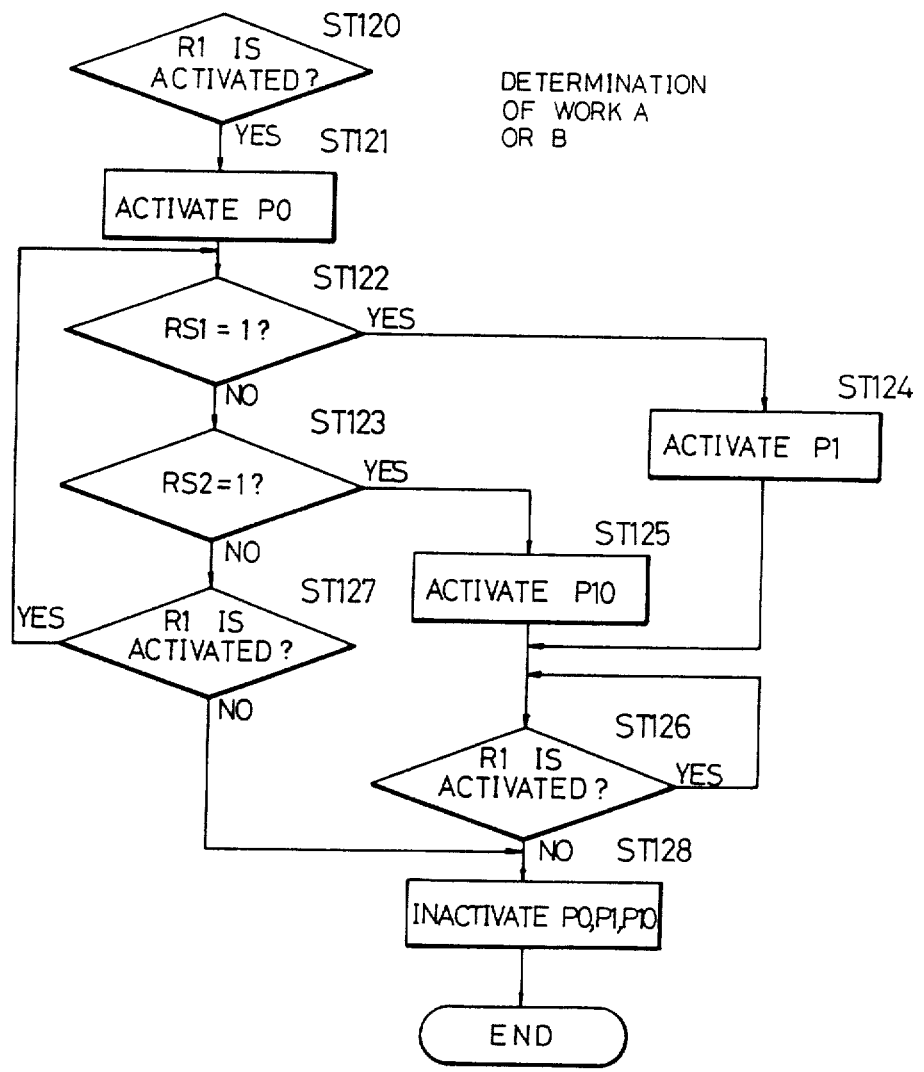

Further, as shown in FIG. 6(H), when R1 indicative of the route selection and confluence is active (in step 120), CPU activates the state point P0 (in step 121) and determines whether the route selection conditions RS1 and RS2 are 1; that is, CPU checks which workpiece A or B is processed on the basis of signals outputted from the external controller to indicate the kind of workpiece or from sensors connected to the sequence control system (in steps 122, 123). If the route selection condition RS1 is determined as 1; that is, the workpiece A is determined to be processed (in step 122), CPU activates the state point P1 to determine whether R1 indicative of the route selection and confluence is active (in step 124 and 126). If the route selection condition RS2 is determined as 1; that is, the workpiece B is determined to be processed (in step 123), CPU activates the state point P10 to determine whether R1 indicative of the route selection and confluence is active (in steps 125 and 126).

On the other hand, CPU determines that both the route selection conditions RS1 and RS2 are not 1; that is, no signals are outputted from the external controller to indicate the kind of workpiece or from sensors connected to the sequence control system (in steps 122 and 123), CPU checks whether the R1 indicative of the route selection and confluence is active (in step 127). If R1 is active, CPU repeats the processes of steps 122, 123, and 127 to stand-by that either one of the route selection condition RS1 or RS2 becomes 1; that is, until signals are outputted from the external controller to indicate the kind of workpiece or from sensors connected to the sequence control system. If R1 is not active (in steps 126 and 127), CPU inactivates the state points P0, P1 and P10 (in step 128).

The above flowchart selects steps for processing a workpiece according to the kind of workpieces on the basis of workpiece selection signals outputted from the external controller to indicate the kind of workpiece or sensors connected to the sequence control system.

Figure 6I:
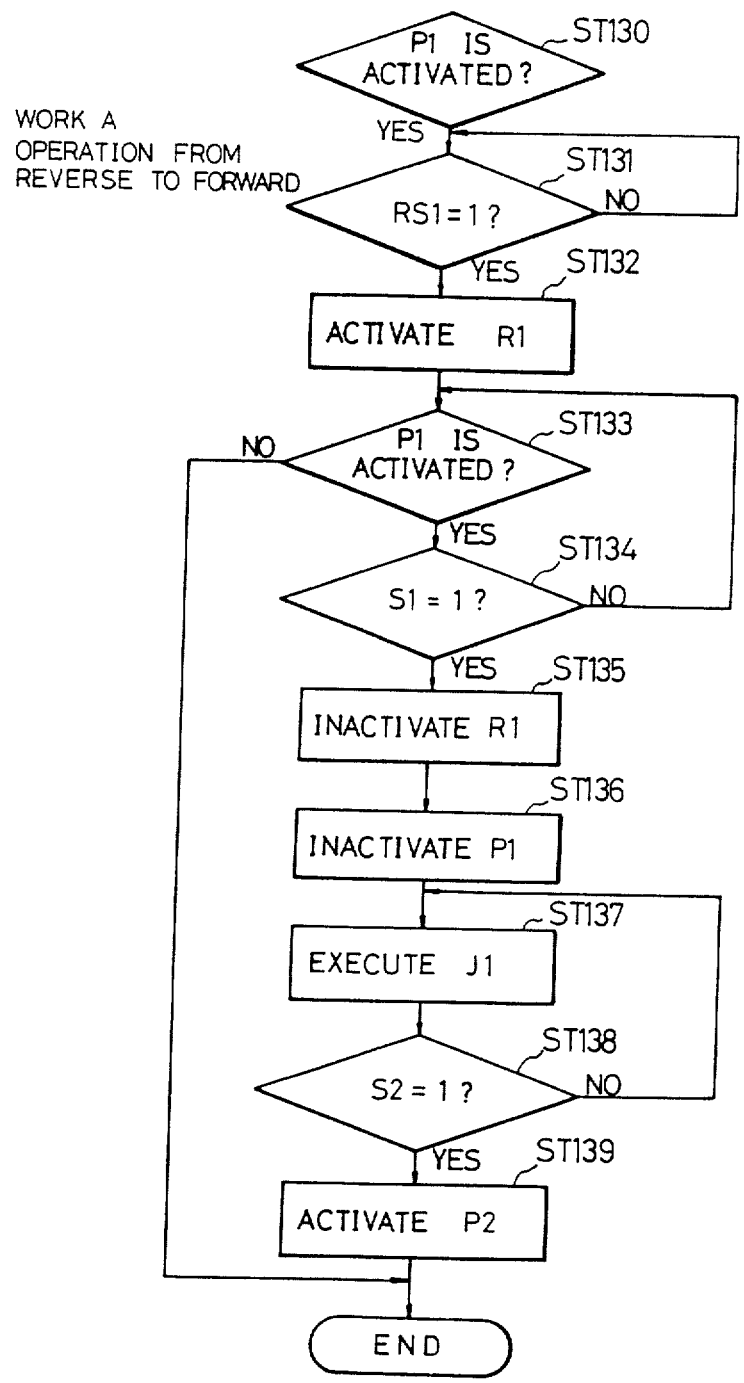

As shown in FIG. 6(I), when the CPU determines that the state point P1 is active (in step 130), CPU checks whether the route selection condition RS1 is 1; that is, which workpiece A or B is to be processed on the basis of signals outputted from the external controller to indicate the kind of workpiece or sensors connected to the sequence control system (in step 131). If RS1 is not 1, CPU repeats this step 131 until RS1 becomes 1; that is, conditions that workpiece A is to be processed is satisfied. On the other hand, if the route selection condition RS1 is 1, CPU activates R1 indicative of the route selection and confluence (in step 132). Thereafter, CPU determines whether the state point P1 is active. If not active, control ends (in step 133). If active, CPU checks whether the transition condition S1 is 1; that is, CPU checks whether the condition under which the execution instruction group J1 can be executed is satisfied (in step 134). If S1 is not 1, CPU repeats the processes of steps 133 and 134 to execute the execution instruction group J1 immediately after the transition condition S1 is satisfied; if S1 is 1, CPU inactivates the R1 indicative of the route selection and confluence and the state point P1 to execute the execution instruction group J1; that is, to set the workpiece A from the reverse process to the forward process (in steps 135, 136 and 137). Thereafter, CPU determines whether the transition condition S2 is 1; that is, the condition under which the execution instruction group J1 can be ended is satisfied or the workpiece A is set to the forward process (in step 138). If S2 is not 1, CPU repeats the processes of steps 137 and 138 to continuously execute the execution instruction group J1; that is, to shift the workpiece A to the forward process. If S2 is 1; that is, if the workpiece A is shifted to the forward process, CPU activates the state point P2 to complete the processing (in step 139).

The above flowchart shows the processing for setting the workpiece A from the reverse process to the forward process.

Figure 6J:
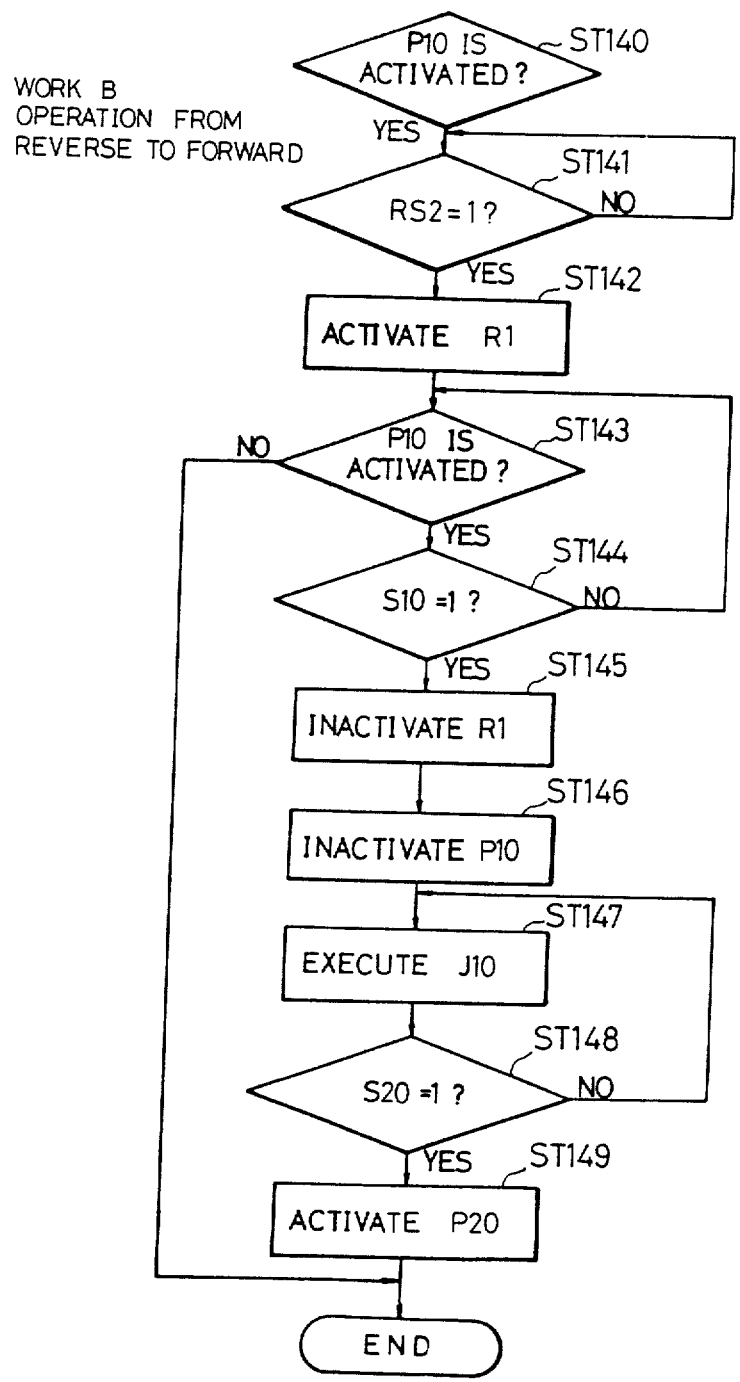

On the other hand, as shown in FIG. 6(J) when the CPU determines that the state point P10 is active (in step 140), CPU checks whether the route selection condition RS2 is 1; that is, which workpiece A or B is to be processed on the basis of signals outputted from the external controller to indicate the kind of workpiece or sensors connected to the sequence control system (in step 141). If RS2 is not 1, CPU repeats this step 141 until RS2 becomes 1; that is, conditions that workpiece B is to be processed is satisfied. On the other hand, if the route selection condition RS2 is 1, CPU activates R1 indicative of the route selection and confluence (in step 142). Thereafter, CPU determines whether the state point P10 is active. If not active, control ends (in step 143). If active, CPU checks whether the transition condition S10 is 1; that is, CPU checks whether the condition under which the execution instruction group J10 can be executed is satisfied (in step 144). If S10 is not 1, CPU repeats the processes of steps 143 and 144 to execute the execution instruction group J10 immediately after the transition condition S10 is satisfied; if S10 is 1, CPU inactivates the R1 indicative of the route selection and confluence and the state point P10 to execute the execution instruction group J10; that is, to set the workpiece B from the reverse process to the forward process (in steps 145, 146 and 147). Thereafter, CPU determines whether the transition condition S20 is 1; that is, the condition under which the execution instruction group J10 can be ended is satisfied or the workpiece B is set to the forward process (in step 148). If S20 is not 1, CPU repeats the processes of steps 147 and 148 to continuously execute the execution instruction group J10; that is, to shift the workpiece B to the forward process. If S20 is 1; that is, if the workpiece B is shifted to the forward process, CPU activates the state point P20 to complete the processing (in step 149).

The above flowchart shows the processing for setting the workpiece B from the reverse process to the forward process.

Figure 6K:
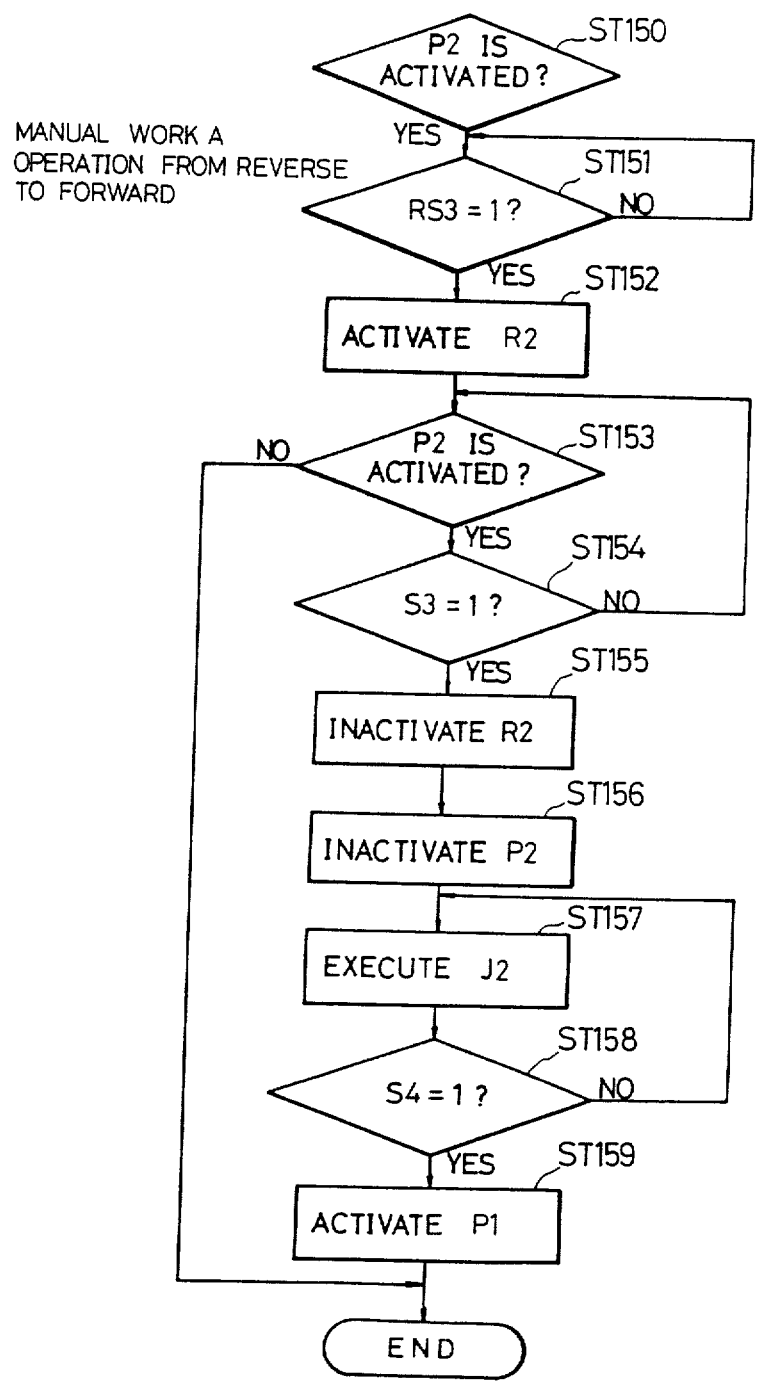

As shown in FIG. 6(K), when the CPU determines that the state point P2 is active; that is, the workpiece A shown in FIGS. 1 and 1(A) is shifted from the forward process to the reverse process (in step 150), CPU checks whether the route selection condition RS3 is 1; that is, whether the workpiece A has been processed and is shiftable to the succeeding process (in step 151). If RS3 is not 1, CPU repeats this step 151 until RS3 becomes 1; that is, conditions that workpiece A has been processed is satisfied. On the other hand, if the route selection condition RS1 is 1, CPU activates R2 indicative of the route selection and confluence (in step 152). Thereafter, CPU determines whether the state point P2 is active. If not active, control ends (in step 153). If active, CPU checks whether the transition condition S3 is 1; that is, CPU checks whether the condition under which the execution instruction group J2 can be executed (in practice, the workpiece A can be shifted from the reverse process to the forward process) is satisfied (in step 154). Further, the above condition can be set by turning on the manual pushbutton switch. If S1 is not 1, CPU repeats the processes of steps 153 and 154 to execute the execution instruction group J2 immediately after the transition condition S3 is satisfied; if S3 is 1, CPU inactivates the R2 indicative of the route selection and confluence and the state point P2 to execute the execution instruction group J2; that is, to set the workpiece A from the reverse process to the forward process (in steps 155, 156 and 157). Thereafter, CPU determines whether the transition condition S4 is 1; that is, the condition under which the execution of the execution instruction group J2 can be ended is satisfied or the workpiece A is set to the forward process (in step 158). Further, the above condition can be set by turning off the manual pushbutton switch. If S4 is not 1, CPU repeats the processes of steps 157 and 158 to continuously execute the execution instruction group J2; that is, to shift the workpiece A to the forward process. If S4 is 1; that is, if the workpiece A is shifted to the forward process, CPU activates the state point P1 to complete the processing (in step 159).

The above flowchart shows the processing for setting the workpiece A from the reverse process to the forward process by manual operation. Further, when being executed, the execution instruction group J2 is interlocked with the execution instruction group J1.

Figure 6L:
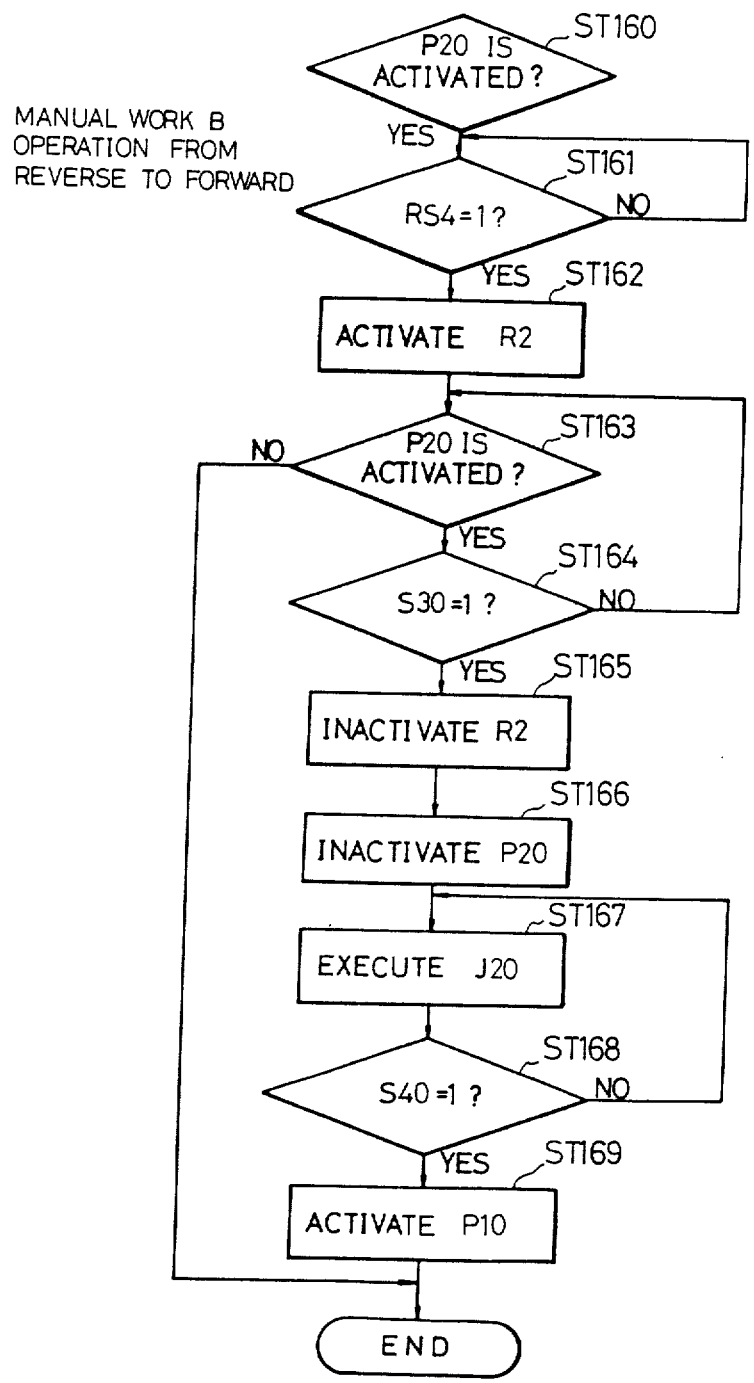

Further, as shown in FIG. 6(L), when the CPU determines that the state point P20 is active; that is, when the workpiece B shown in FIGS. 1 and 1(A) is shifted from the forward process to the reverse process (in step 160), CPU checks whether the routine selection condition RS4 is 1; that is, whether the workpiece B has been processed and shiftable to the succeeding process (in step 161). If RS4 is not 1, CPU repeats this step 161 until RS4 becomes 1; that is, conditions that workpiece B has been processed is satisfied. On the other hand, if the route selection condition RS4 is 1, CPU activates R2 indicative of the route selection and confluence (in step 162). Thereafter, CPU determines whether the state point P20 is active. If not active, control ends (in step 163). If active, CPU checks whether the transition condition S30 is 1; that is, CPU checks whether the condition under which the execution instruction group J20 can be executed (in practice, the workpiece B can be shifted from the reverse process to the forward process) is satisfied (in step 164). Further, the above condition can be set by turning on the manual pushbutton switch. If S30 is not 1, CPU repeats the processes of steps 163 and 164 to execute the execution instruction group J20 immediately after the transition condition S30 is satisfied; if S30 is 1, CPU inactivates the R2 indicative of the route selection and confluence and the state point P20 to execute the execution instruction group J20; that is, to set the workpiece B from the reverse process to the forward process (in steps 165, 166 and 167). Thereafter, CPU determines whether the transition condition S40 is 1; that is, the condition under which the execution instruction group J20 can be ended is satisfied or the workpiece B is set to the forward process (in step 168). Further, the above condition can be set by turning off the manual pushbutton switch. If S40 is not 1, CPU repeats the processes of steps 167 and 168 to continuously execute the execution instruction group J20; that is, to shift the workpiece B to the forward process. If S40 is 1; that is, if the workpiece B is shifted to the forward process, CPU activates the state point P10 to complete the processing (in step 169).

The above flowchart shows the processing for shifting the workpiece B from the reverse process to the forward process. Further, when being executed, the execution instruction group J20 is interlocked with the execution instruction group J1.

Figure 6M:
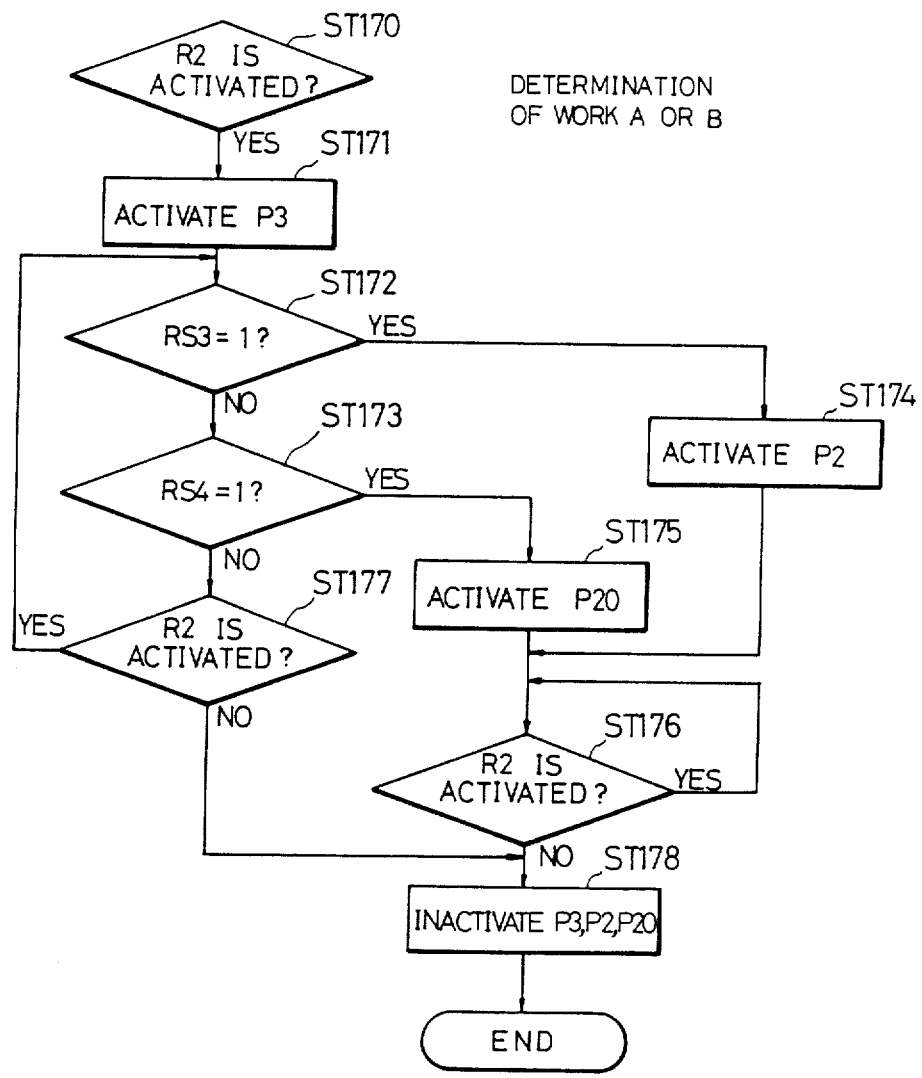
Figure 6:
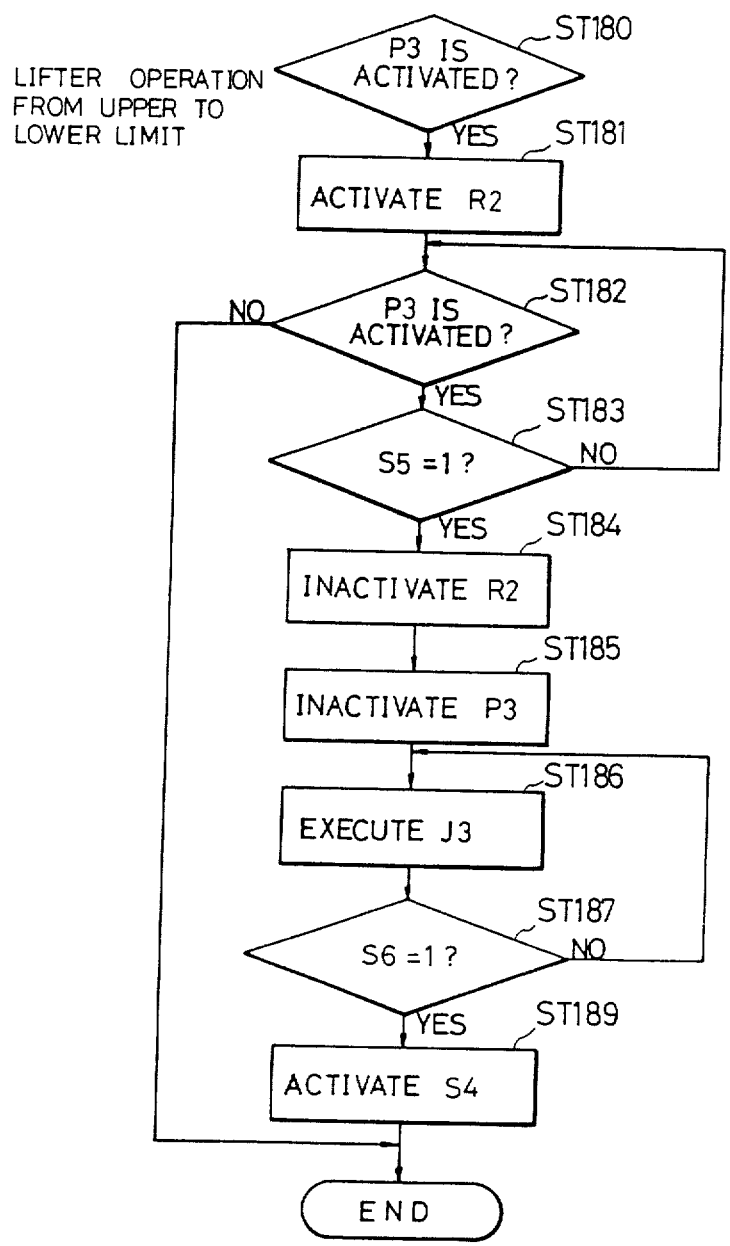

Further, as shown in FIG. 6(M), when R2 indicative of the route selection and confluence is active (in step 170), CPU activates the state point P3 (in step 171) and determines whether the route selection conditions RS3 and RS4 are 1; that is, CPU checks which workpiece A or B has been processed (in steps 172, 173). If the route selection condition RS3 is determined as 1; that is, the workpiece A is determined to be processed (in step 172), CPU activates the state point P2 to determine whether R2 indicative of the route selection and confluence is active (in step 174 and 176). If the route selection condition RS4 is determined as 1; that is, the workpiece B is determined to be processed (in step 173), CPU activates the state point P20 to determine whether R2 indicative of the route selection and confluence is active (in steps 175 and 176).

On the other hand, CPU determines that both the route selection conditions RS3 and RS4 are not 1; that is, neither of the workpieces A and B is not yet processed (in steps 172 and 173), CPU checks whether the R2 indicative of the route selection and confluence is active (in step 177). If R2 is active, CPU repeats the processes of steps 172, 173, and 177 to stand-by that either one of the route selection condition RS3 or RS4 becomes 1; that is, until either of the workpiece A or B has been processed. If R2 is not active (in steps 176 and 177), CPU inactivates the state points P3, P2 and P20 (in step 178).

The above flowchart selects the next steps to which the process can proceed after either of the workpiece A or B has been processed.

Further, as shown in FIG. 6(N), when CPU determines that the state point P3 is active (in step 180), CPU activates the route selection and confluence R2 (in step 181). CPU checks whether the state point P3 is active (in step 182). If not active, control ends. If active, CPU determines whether the transition condition S5 is 1; that is, CPU checks the condition under which an execution instruction group J3 can be executed (in practice, the lifter can be moved from the lower limit to the upper limit) (in step 183). If S5 is not 1, CPU repeats the processes of steps 182 and 183; if S5 is 1, CPU inactivates the points R2 and P3 to execute the execution instruction group J3 (in steps 184, 185, 186). Thereafter, CPU determines whether the transition condition S6 is 1; that is, CPU checks whether the condition under which the execution instruction group J3 can be ended is satisfied (in step 187). If S6 is not 1, CPU repeats the processes of steps 186 and 187 to continuously execute the execution instruction group J3; if S6 is 1, CPU activates the state point S4 (in step 188) to complete the process.

As described above, in the system and the method of the present invention, since the execution instruction groups can be executed automatically and also manually for each processing step, even if the machine stops during automatic operation for some reason or other, the operator can switch the operation from the automatic to the manual in order to move the machine elements for troubleshooting in the forward and reverse directions. After the machine has been repaired, the machine is switched from the manual to the automatic operation to start the machine from any processing step at which the machine stops due to trouble.

Further, since it is possible to represent processing step programs as one block for each process, it is possible to simplify program entering processings required when the machine is modified or repaired, thus improving the work efficiency.

Further, in the above embodiment, the processing contents of the reverse side execution instruction group are opposite in operation to those of the forward side execution instruction group. However, it is also possible to prepare two different reverse side instruction groups which are the same and opposite, respectively to the forward side execution instruction group, simultaneously.

Figure 7:
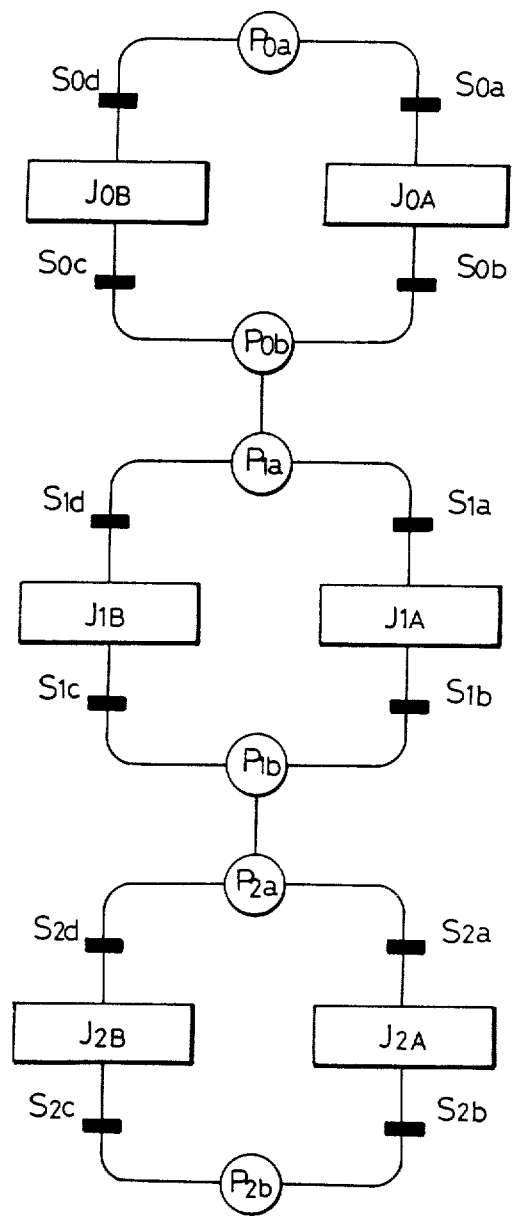
FIG. 7 is a conceptual diagram showing a processing example of a first modification of the sequence control method of the present invention in which the forward side executing means can be stopped in case of trouble and the actuating member can be reversed to the original position by depressing a pushbutton switch.

With reference to FIGS. 7 and 8, a first modification of the sequence control system and method according to the present invention will be described hereinbelow. In the basic embodiment already described, the actuation end side actuating means E is activated only when the forward side stopping means D is turned on. However, in case the forward side executing means C stops during operation, since the forward side stopping means D is not turned on, the actuation end side activating means E is not activated.

To overcome this problem, that is, to facilitate the repair work when the actuation member stops during operation, in this first modification, when the forward side actuating means B is turned on under the activation condition of the actuation start side activating means A, although the actuation start side activating means A is inactivated, the actuation end side activating means E is half activated. Under these condition, in case the forward side executing means C stops due to trouble, the reverse side actuating means E (in this case, a pushbutton switch) is turned on, so that the forward side executing means C is stopped and the reverse side executing means G is actuated to reverse the actuation member to the original position for troubleshooting or repair.

FIG. 7 is a conceptual diagram showing the method of operating the machine as shown in FIGS. 1, 1(A) and 1(B) in accordance with a sequence control method related to the first modification.

In these conceptual diagrams of the processing method, P0a, P1a and P2a denote state points of the actuation start side activating means A; P0b, P1b and P2b denote state points of the actuation end side activating means E; S0a, S1a and S2a denote transition conditions of the forward side actuating means B; S0b S1b and S2b denote transition conditions of the forward side stopping means D; S0c, S1c and S2c denote transition conditions of the reverse side actuating means F; S0d, S1d and S2d denote transition conditions of the reverse side stopping means H; J0A, J1A and J2A denote execution instruction group of the forward side executing means C; J0B, J1B and J2B denote execution instruction group of the reverse side executing means G.

When the actuation member is a lifting cylinder shown in FIGS. 1 and 1(A), this cylinder is operated in the forward stepping direction on the basis of a signal from the forward side executing means C and in the reverse direction on the basis of a signal from the reverse side executing means G. In this case, the forward side actuating means B, the forward side stopping means D, the reverse side actuating means F, and the reverse side stopping means H are all limit switches, respectively.

Each element shown in this conceptual diagram operates in accordance with a flowchart as shown in FIG. 8 as follows: The basic operation will be described with reference to FIG. 7.

A state point P0b of the actuation end side activating means for a certain process is activated at the end of the process by a CPU for controlling the entire operation of the sequence control system as shown in FIG. 8.

Figure 8A:
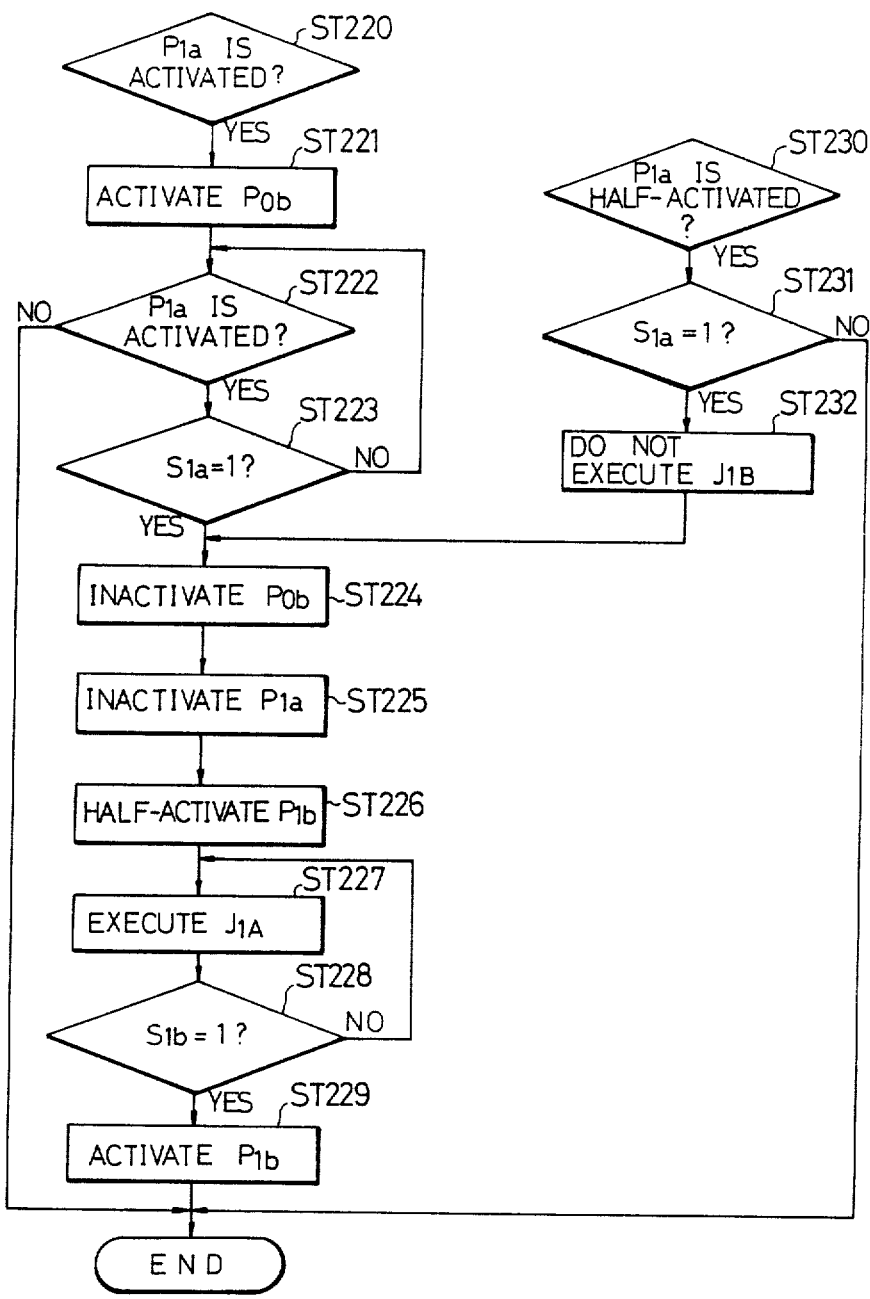
FIG. 8(A) and (B) are flowcharts for assistance in explaining the operation of an example of the first modification of the sequence control method of the present invention shown, in FIG. 7.

With reference to FIG. 8(A), CPU first checks whether the state point P1a of the actuation start side activating means is activated (in step 220). If activated, CPU activates the state point P0b of the activation end side activating means (in step 221). Further, CPU checks again whether the P1a is activated (in step 222). If not activated, control ends. If activated, CPU checks whether the transition condition S1a of the forward side actuating means is 1 (in step 223). If S1a is not 1, CPU returns to step 222 to repeat the same processing. If S1a is 1, CPU inactivates the state point P0b of the actuation end side activating means for the preceding process (in step 224) and that P1a of the actuation start side activating means for the present process (in step 225) and further half-activates that P1b of the actuation end side activating means for the present process (in step 226). Further, CPU executes the execution instruction group J1A of the forward side execution means (in step 227). Thereafter, CPU checks whether the transition condition S1b of the forward side stopping means is 1 (in step 228). If S1b is not 1, CPU returns to the step 227. If S1b is 1, CPU activates the state point P1b (which has been half-activated in step 226) of the actuation end side activating means in step 229). Here, it should be noted that if the system operates normally, S1b will be changed to 1; that is, the forward side stopping means will be actuated to stop the forward side executing means, so that the half-activated P1b is returned to an activated condition as in the flowchart shown in FIG. 5(A). However, in case S1b will not be changed to 1; that is, the forward side stopping means will not be actuated to stop the forward side executing means due to trouble, the P1b is kept half-activated. Under these conditions, CPU checks whether P1b is half-activated (in step 250) shown in FIG. 8(B). If P1b is still kept half-activated, CPU checks whether the transition condition S1c of the reverse side actuating means is 1 (in step 251). If S1c is not 1, control ends. If S1c is 1, CPU stops to execute the execution instruction group J1A (in step 252) and proceeds to step 244 in order to execute the execution instruction group J1B (in step 247), that is, to move the forward side execution means in the reverse direction for troubleshooting.

Figure 8B:
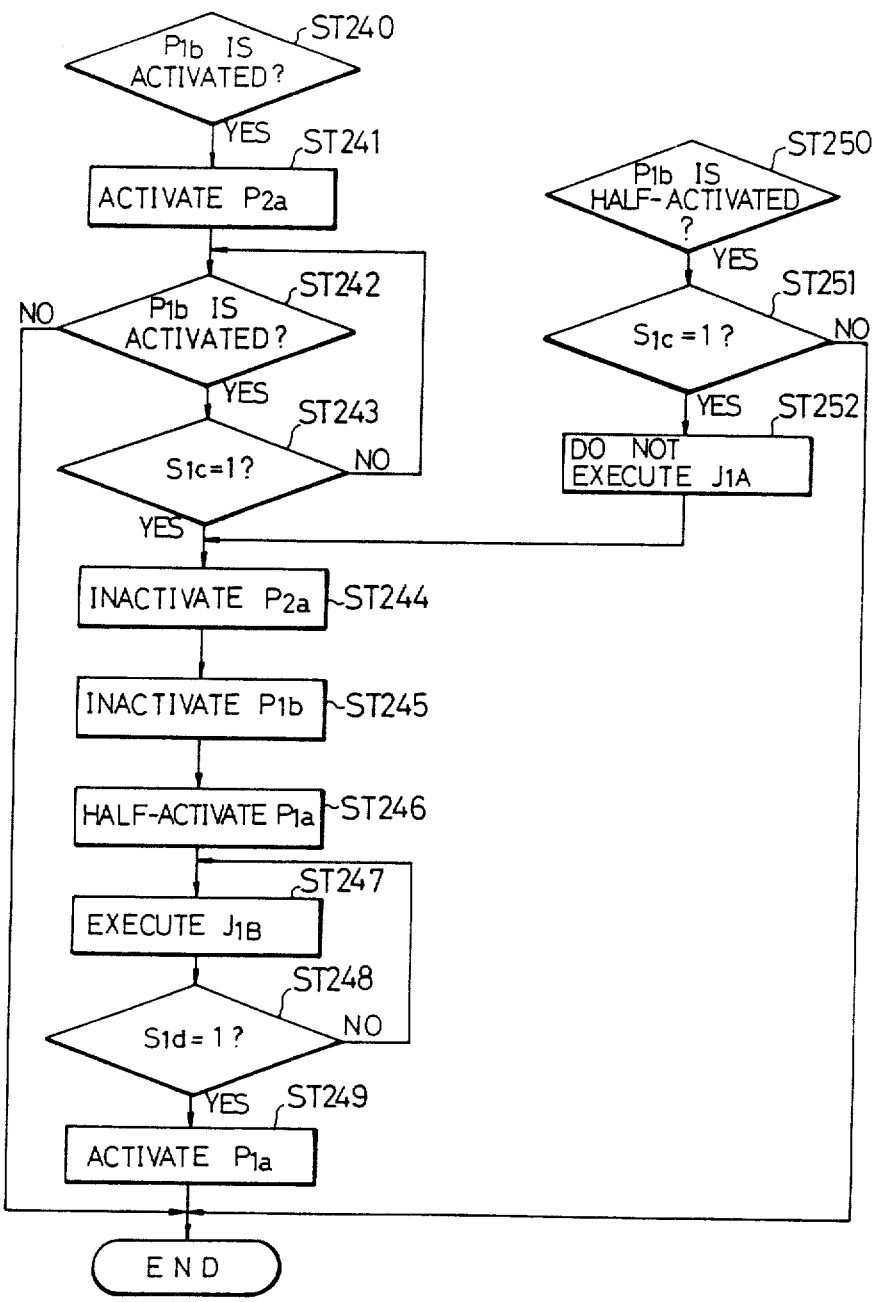

With reference to FIG. 8(B), CPU first checks whether the state point P1b of the actuation end side activating means is activated (in step 240). If activated, CPU activates the state point P2a of the activation start side activating means (in step 241). Further, CPU checks again whether the P1b is activated (in step 242). If not activated, control ends. If activated, CPU checks whether the transition condition S1c of the reverse side actuating means is 1 (in step 243). If S1c is not 1, CPU returns to step 242 to repeat the same processing. If S1c is 1, CPU inactivates the state point P2a of the actuation start side activating means for the succeeding process (in step 244) and that P1b of the actuation end side activating means for the present process (in step 245) and further half-activates that P1a of the actuation start side activating means for the present process (in step 246). Further, CPU executes the execution instruction group J1B of the reverse side execution means (in step 247). Thereafter, CPU checks whether the transition condition S1d of the forward side stopping means is 1 (in step 248). If S1b is not 1, CPU returns to the step 247. If S1a is 1, CPU activates the state point P1b (which has been half-activated in step 246) of the actuation start side activating means (in step 249). Here, it should be noted that if the system operates normally, S1d will be changed to 1; that is, the reverse side stopping means will be actuated to stop the reverse side executing means, so that the half-activated P1a is returned to an activated condition as in the flowchart shown in FIG. 5(B). However, in case S1d will not be changed to 1; that is, the reverse side stopping means will not be actuated to stop the reverse side executing means due to trouble, the P1a is kept half-activated. Under these conditions, CPU checks whether P1a is half-activated (in step 230) shown in FIG. 8(A). If P1a is still kept half-activated, CPU checks whether the transition condition S1a of the forward side actuating means is 1 (in step 231). If S1a is not 1, control ends. If S1a is 1, CPU stops to execute the execution instruction group J1B (in step 232) and proceeds to step 224 in order to execute the execution instruction group J1A (in step 227), that is, to move the reverse side execution means in the forward direction for troubleshooting.

In FIG. 7, therefore, if the transition condition S1a becomes 1 after the actuation member (e.g. cylinder) for the second process has been repaired, this actuation member (e.g. cylinder) is moved in the forward stepping direction in the same way. Under these conditions, if the transition condition S0c is set to 1, since the actuation member for the preceding process can be moved in the reverse direction, it is possible to return the present process to the first control process in sequence, and to start moving each actuation member again in the forward stepping direction in a predetermined sequence beginning from the returned process.

Therefore, when the sequence control method of the present invention is adopted to control various apparatus, even if one of actuation members such as cylinders, motors, etc. constituting the apparatus stops during operation due to trouble, it is possible to restart the control apparatus by returning the actuation member in the reverse direction. In the prior-art sequence control, when a part of actuation members constituting the entire apparatus develops trouble, the apparatus is switched to the manual control to return all the actuation members to the original position; and then the apparatus is required to start from the first again. In the sequence control of the present invention, it is possible to restart the apparatus from the state where trouble occurs by repairing or adjusting only the actuation member which develops trouble to the original conditions.

With reference to FIG. 9 and FIGS. 10(A) to (C), a second modification of the sequence control system and method according to the present invention will be described hereinbelow.

In this second modification, the system is further provided with a self-diagnosis function for checking whether each actuation member operates normally by measuring processing time for each processing step.

With reference to FIG. 2 again, the sequence control system further comprises: (a) forward side execution time measuring means, activated when said forward side actuating means is turned on and deactivated when said forward side stopping means is turned on, for measuring a forward side processing time of said forward side executing means; (b) reverse side execution time measuring means, activated when said reverse side actuating means is turned on and deactivated when said reverse side stopping means is turned on, for measuring a reverse side processing time of said reverse side executing means; (c) execution time storing means I for storing reference forward and reverse side processing times of said forward and reverse side executing means, respectively; and (d) comparing means K, coupled to said forward and reverse side time measuring means and said execution time storing means, for comparing forward and reverse processing times measured by said forward and reverse side time measuring means with reference forward and reverse side processing times, separately for checking whether said forward and reverse actuating means operate normally.

Figure 9:
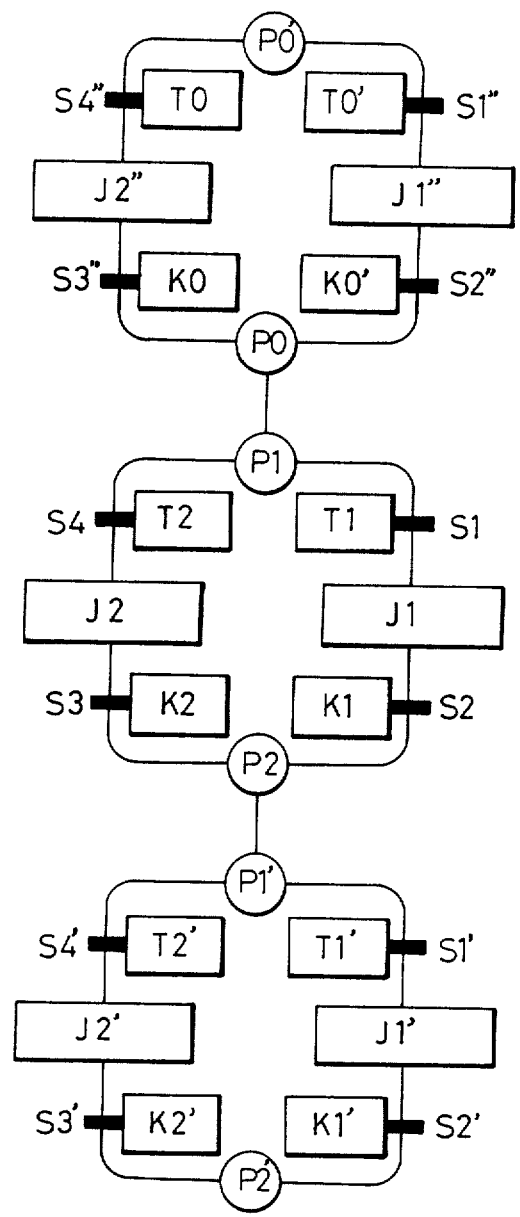
FIG. 9 is a conceptual diagram showing a processing example of a second modification of the sequence control method of the present invention in which a diagnosis method of measuring processing times of the forward and reverse side executing means is incorporated.

FIG. 9 is a conceptual diagram showing the method of operating the machine as shown in FIGS. 1, 1(A) and (B) in accordance with a sequence control method related to the second modification.

In these conceptual diagrams of the processing method, P0', P1 and P1' denote state points of the actuation start side activating means; P0, P2 and P2' denote state points of the actuation end side activating means; S1", S1 and S1' denote transition conditions of the forward side actuating means; S2", S2 and S2' denote transition conditions of the forward side stopping means; S3", S3 and S3' denote transition conditions of the reverse side actuating means; S4", S4 and S4' denote transition conditions of the reverse side stopping means; J1", J1 and J1' denote execution instruction group of the forward side executing means; J2", J2 and J2' denote execution instruction group of the reverse side executing means; T0', T1, T1', T0, T2, and T2' denote timers as execution time storing means; and K0', K1, K1', K0, K2 and K2' denote execution time measuring timers, respectively.

Figure 10A:
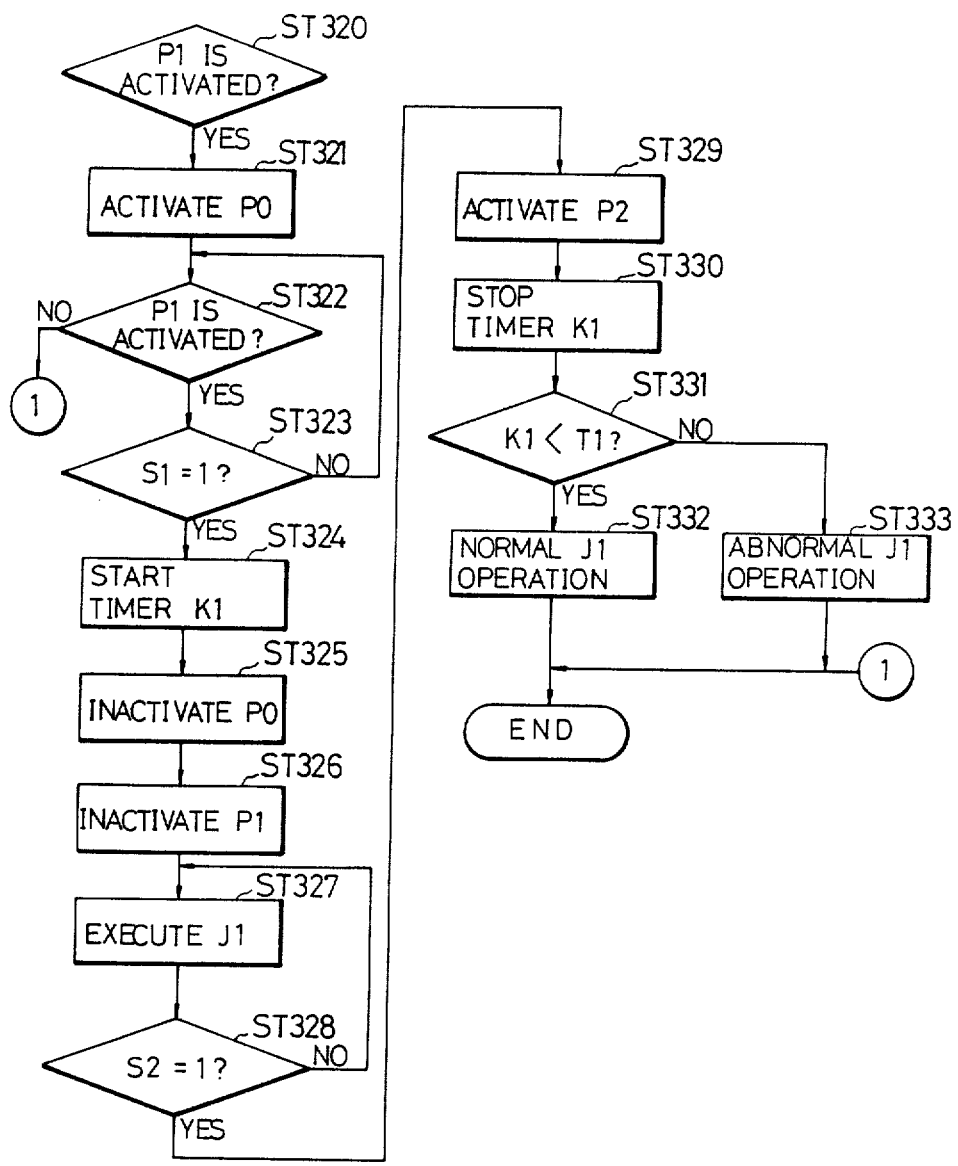
FIGS. 10(A) to 10(C) are flowcharts for assistance in explaining the operation of the second modification of the sequence control method of the present invention shown in FIG. 9.
Figure 10B:
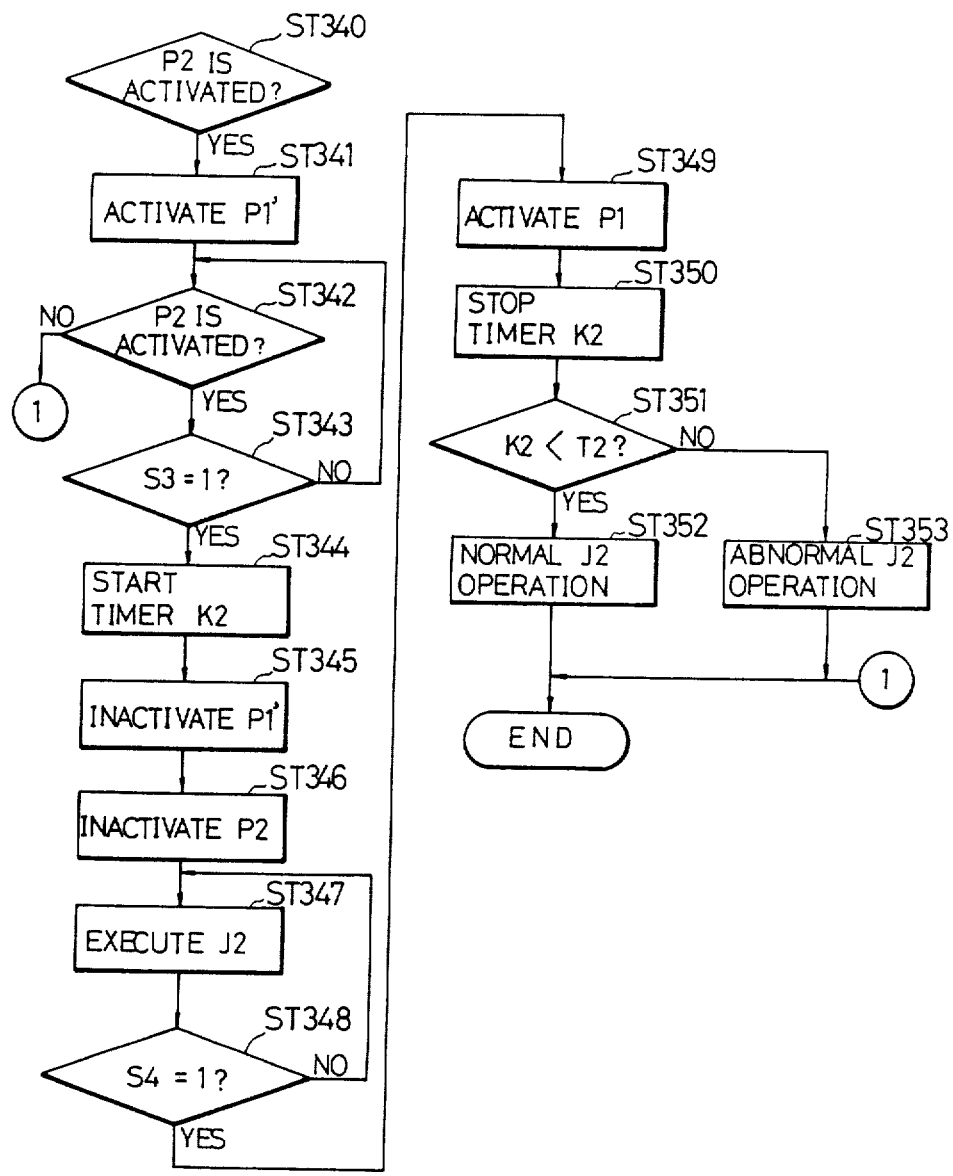
Figure 10C:
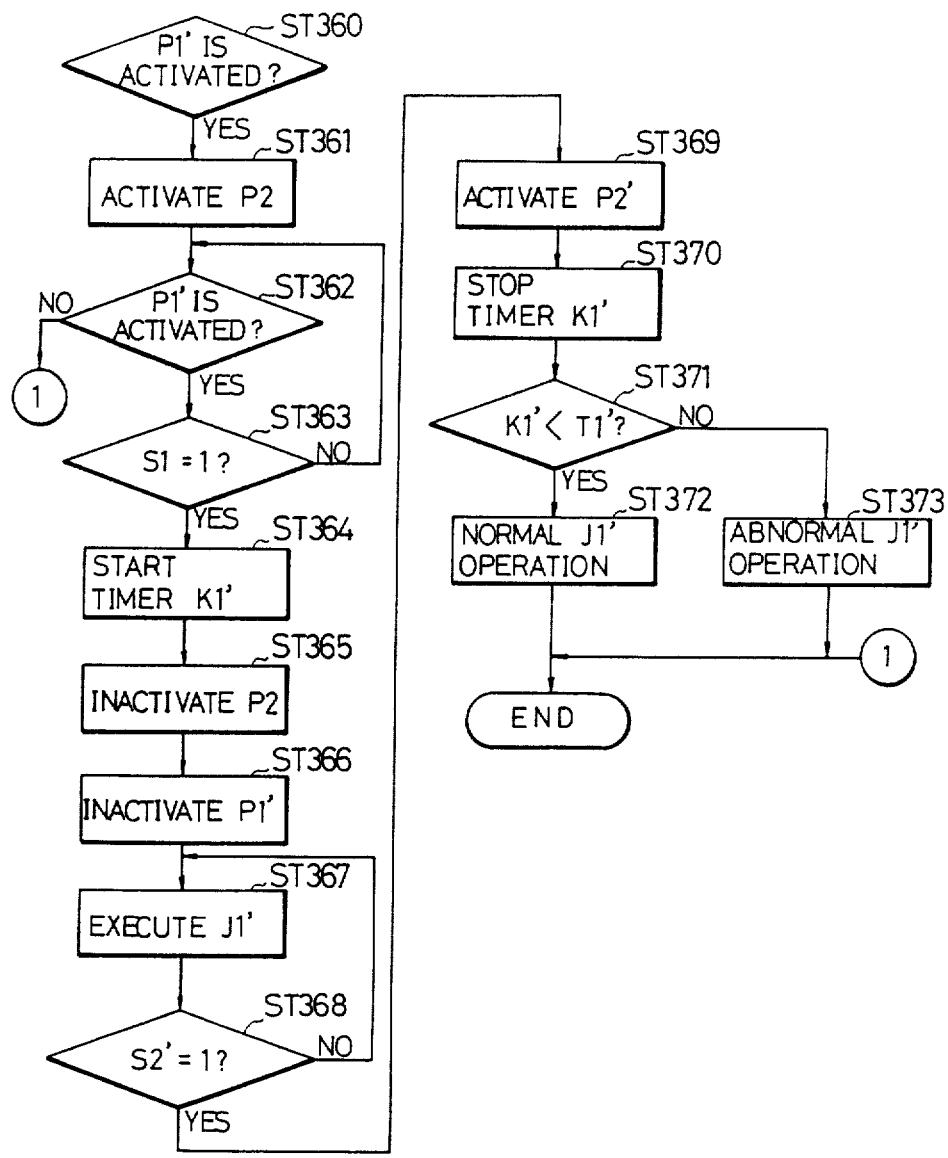

Each system element shown in the conceptual diagram operates on the basis of the flowchart as shown in FIG. 10(A) to (C) as follows:

In FIG. 10(A), after the preceding process has been ended and therefore the state point P1 is activated; that is, the lifter shown in FIGS. 1, 1(A) and 1(B) is moved to an upper limit (in step 320). CPU activates the state point P0 (in step 321). CPU determines whether the state point P1 is active (in step 322). If not active, control ends. If active, CPU determines whether the transition condition S1 is 1; that is, whether the condition under which the execution instruction group J1 can be executed is satisfied (in practice, CPU checks whether the lifter shown in FIGS. 1, 1(A) and 1(B) is set to the upper limit and the clamps 1 and 2 can be operated) (in step 323). If S1 is not 1, CPU repeats the processes of steps 322 and 323 to standby the execution of the execution instruction group J1 immediately after the transition condition S1 is satisfied. If S1 is 1, CPU activates a timer K1 for measuring the execution time of the execution instruction group J1 and inactivates the state points P0 and P1 to execute the execution instruction group J1 (that is, the clamps 1 and 2 are moved in the forward direction) (in steps 324, 325, 326 and 327). CPU determines whether the transition condition S2 is 1; that is, whether the condition under which the execution of the execution instruction group J1 can be ended is satisfied (in practice, the clamps 1 and 2 are moved to the movable end) (in step 328). If S2 is not 1, CPU repeats the processes of steps 27 and 28 to continuously execute the execution of the execution instruction group J1 (the clamps 1 and 2 are moved to the movable limit). If S2 is 1; that is, when the clamps 1 and 2 are moved to the movable limit, CPU activates the state point P2 (in step 329) to stop a timer K1 for measuring the execution time of the execution instruction group J1 (in step 330). CPU compares the actual time required to execute the execution instruction group J1 and measured by the timer K1 with a reference time required to normally execute this execution instruction group J1 and previously stored in the timer T1 (in step 331). If the measurement time of the timer K1 lies within the reference time stored in the timer T1; that is, the time required to move the clamps 1 and 2 to the movable limit lies within a reference time, CPU determines that the operation of the execution instruction group J1 is normal (in step 332). On the other hand, if the measurement time of the timer K1 does not lie within the reference time stored in the timer T1, CPU determines that the operation of the execution instruction group J1 is abnormal (in step 333).

As shown in FIG. 10(B), after the preceding process has been ended and therefore the state point P2 is activated; that is, the clamps 1 and 2 shown in FIGS. 1, 1(A) and 1(B) is moved to a movable limit (in step 340). CPU activates the state point P1' (in step 341). CPU determines whether the state point p2 is active (in step 342). If not active, control ends. If active, CPU determines whether the transition condition S3 is 1; that is, whether the condition under which the execution instruction group J2 can be executed is satisfied (in practice, CPU checks whether the clamps 1 and 2 shown in FIGS. 1, 1(A) and 1(B) can be operated manually or whether a pushbutton switch is turned on to return the clamps 1 and 2 by manual operation) (in step 343). If S3 is not 1, CPU repeats the processes of steps 342 and 343 to standby the execution of the execution instruction group J2 immediately after the transition condition S3 is satisfied. If S3 is 1, CPU activates a timer K2 for measuring the execution time of the execution instruction group J2 and inactivates the state points P1' and P2 to execute the execution instruction group J2 (that is, the clamps 1 and 2 are returned (in steps 344, 345, 346 and 347). CPU determines whether the transition condition S4 is 1; that is, whether the condition under which the execution of the execution instruction group J2 can be ended is satisfied (in practice, whether the pushbutton switch is turned off) (in step 348). If S4 is not 1, CPU repeats the processes of steps 347 and 348 to continuously execute the execution of the execution instruction group J2 (the clamps 1 and 2 are moved in the reverse direction). If S4 is 1; that is, when the pushbutton switch is turned off, CPU activates the state point P1 (in step 349) to stop a timer K2 for measuring the execution time of the execution instruction group J2 (in step 350). CPU compares the actual time required to execute the execution instruction group J2 and measured by the timer K2 with a reference time required to normally execute this execution instruction group J2 and previously stored in the timer T2 (in step 351). If the measurement time of the timer K2 lies within the reference time stored in the timer T2; that is, the time required to move the clamps 1 and 2 to the return limit lies within a reference time, CPU determines that the operation of the execution instruction group J2 is normal (in step 352). On the other hand, if the measurement time of the timer K2 does not lie within the reference time in the timer T2, CPU determines that the operation of the execution instruction group J2 is abnormal (in step 353).

As shown in FIG. 10(C), after the preceding process has been ended and therefore the state point P1' is activated; that is, the lifter shown in FIGS. 1, 1(A) and 1(B) is moved to a movable limit (in step 360). CPU activates the state point P2 (in step 361). CPU determines whether the state point P1' is active (in step 362). If not active, control ends. If active, CPU determines whether the transition condition S1' is 1; that is, whether the condition under which the execution instruction group J1' can be executed is satisfied (in practice, CPU checks whether the clamps 1 and 2 shown in FIGS. 1(A) and 1(B) is set to the movable limit and a workpiece A or B can be processed) (in step 363). If S1' is not 1, CPU repeats the processes of steps 362 and 363 to standby the execution of the execution instruction group J1' immediately after the transition condition S1' is satisfied. If S1' is 1, CPU activates a timer K1' for measuring the execution time of the execution instruction group J1' and inactivates the state points P2 and P1' to execute the execution instruction group J1' (that is, a workpiece A or B is processed (in steps 364, 365, 366 and 367). CPU determines whether the transition condition S2' is 1; that is, whether the condition under which the execution of the execution instruction group J1' can be ended is satisfied (in practice, the workpiece A or B has been processed (in step 368). If S2' is not 1, CPU repeats the processes of steps 367 and 368 to continuously execute the execution of the execution instruction group J1' (the workpiece A or B is kept processed). If S2' is 1; that is, when the workpiece A or B has been processed, CPU activates the state point P2' (in step 369) to stop a timer K1' for measuring the execution time of the execution instruction group J1' (in step 370). CPU compares the actual time required to execute the execution instruction group J1' and measured by the timer K1' with a reference time required to normally execute this execution instruction group J1' and previously stored in the timer T1' (in step 371). If the measurement time of the timer K1' lies within the reference time stored in the timer T1'; that is, the time required to machine the workpiece A or B lies within a reference time, CPU determines that the operation of the execution instruction group J1' is normal (in step 372). On the other hand, if the measurement time of the timer K1' does not lie within the reference time stored in the timer T1', CPU determines that the operation of the execution instruction group J1' is abnormal (in step 373).

The reference time of the reference timer can be determined by calculating an average value of past operation times of the actuation members or by simply setting the preceding operation time.

With reference to FIGS. 11, 12(A), 12(C), 12(D), 13(A) to (C), a third modification of the sequence control system and method according to the present invention will be described hereinbelow. In this third modification, the system is further provided with a self-diagnosis function for checking whether each actuation member operates normally by checking on/off status of data inputted to the system for each step.

Figure 11:
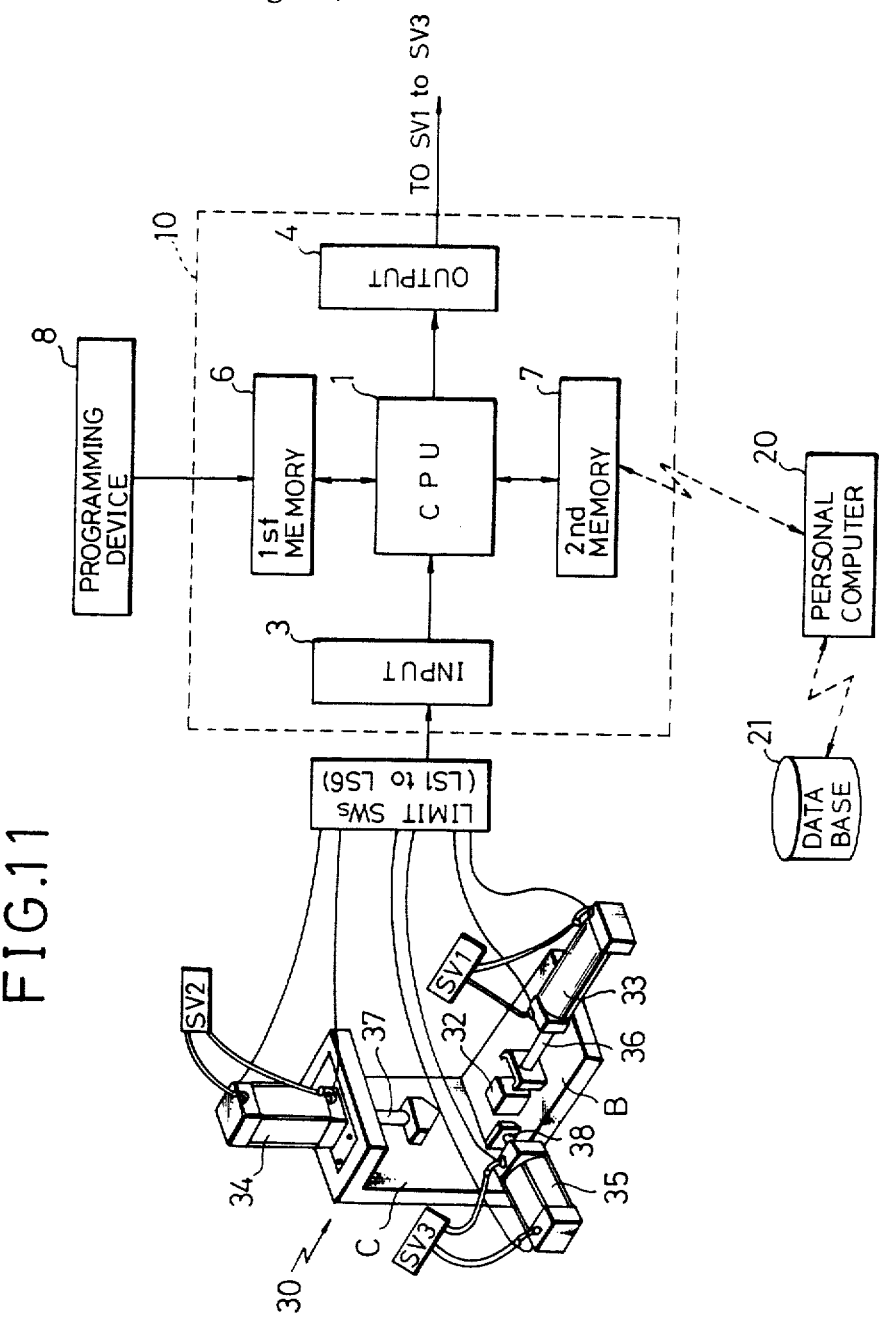
FIG. 11 is a schematic block diagram, partly perspective view, showing third and fourth modifications of the sequence control method of the present invention, in which diagnosis method of comparing input data status of the forward and reverse side executing and actuating means are incorporated.

Recently, programmable controllers (referred to as PC) have been widely used in place of the prior-art relay sequence. Since the PC has such various advantages that the hardware can be standardized; design time can be shortened; sequence can easily be modified on the spot, etc., the PC is widely applied to press machines for pressing workpieces in manufacturing lines of factories. FIG. 11 shows a schematic diagram of a PC connected to a press machine as a sequence control system of the third modification.

As shown, on a base B of a press machine 30, there are mounted a workpiece feed-in cylinder 33 for feeding a workpiece 32 to a predetermined position, and a workpiece feed-out cylinder 35 for feeding the pressed workpiece 32 to the outside. Further, a press cylinder 34 for pressing the workpiece 32 fed by the workpiece feed-in cylinder 33 is mounted on a column C vertically fixed to the base B.

On the other hand, solenoids valves SV1 to SV3 are connected to the workpiece feed-in cylinder 33, the press cylinder 34 and the workpiece feed-out cylinder 35, respectively, to control hydraulic pressure or compressed air supplied from a driving source (not shown), so that the motion of each cylinder rod 36 to 38 can be controlled. Further, limit switches LS1 to LS6 are provided for the workpiece feed-in cylinder 33, the press cylinder 34 and the workpiece feed-out cylinder 35, respectively (two for each cylinder) at an original position and a full stroke position along the longitudinal direction thereof to detect the expansion and contraction positions of these three cylinder rods 36 to 38. These limit switches LS1 to LS6 and these solenoid valves SV1 to SV3 are all connected to a PC 10 for controlling the press machine 30.

As shown in FIG. 11, a sequence control system 10 of the present invention comprises a CPU 1 constituting a part of retrieving means, a first memory section 6, a second memory section 7 serving as present status storing means and reference status storing means, an input section 3, an output section 4, and a programming device 8 connected to the first memory section 6 and serving as a part of the retrieving means. Further, the first memory section 6 stores programs instructive of processing operations and data indicative of calculated results, timer and counter values, etc. On the other hand, the second memory section 7 stores change status of on/off input data of the limit switches LS1 to LS6 operating under normal conditions and the time elapsed. The CPU 1, the input section 3, the output section 4 and the programming device 8 have the same functions as is conventional.

The CPU 1 fetches programs stored in the first memory section 6 in a predetermined sequence, decodes the meanings of instructions, reads (sample) and calculates data in the input section 3 in accordance with the instructions, and outputs calculated data to the output section 4. These input section 3 and the output section 4 are directly connected to an object to be controlled. The input section 4 converts signal levels from the limit switches LS1 to LS6 into internal signal levels; the output section 4 converts the internal signal levels to signal levels high enough to drive the solenoid valves SV1 to SV3.

Figure 12D:
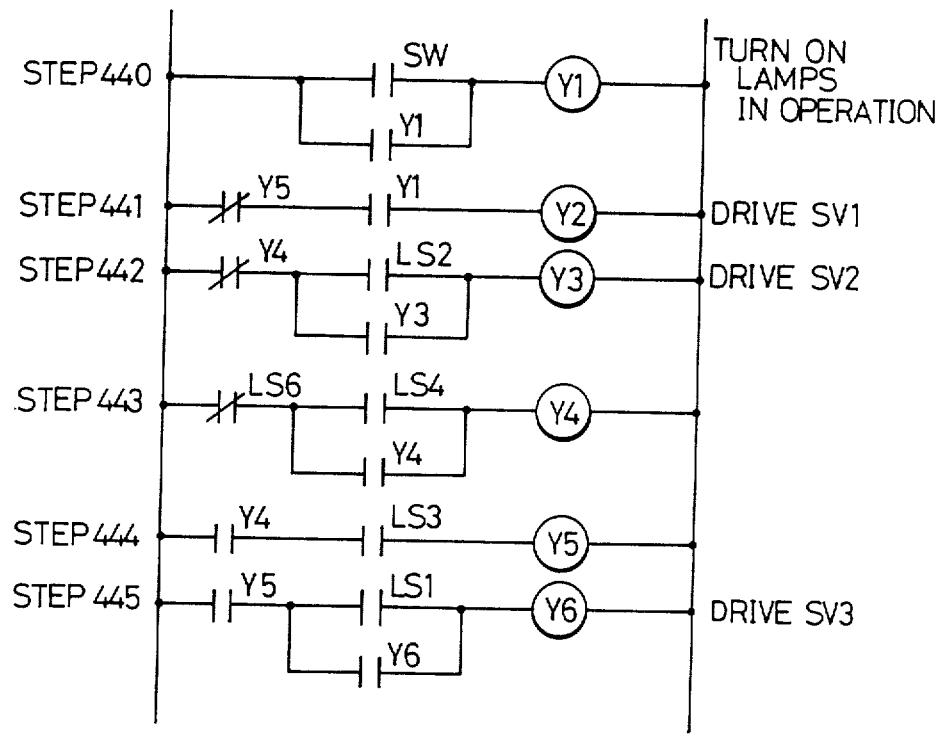
FIG. 12(D) is a relay ladder diagram for assistance in explaining the processing steps of the machine shown in FIG. 11.

In comparison, the operation of the prior-art sequence control system which does not include the second memory section 7 will be explained with reference to a flowchart shown in FIG. 12(A), a timing chart representative of expansion and contraction status of the cylinders 33 to 35 and shown in FIG. 12(C) and a sequence control stored in the memory section 6 and shown in FIG. 12(D).

First, input data indicative of open/close status of each contact of the limit switches LS1 to LS6 are read to the CPU 1, and written at predetermined address in the memory section 6 as an input data table (in step 401). CPU reads values one-to-one corresponding to the sequence circuit shown in FIG. 12(D) step by step, with reference to the input data table stored in the memory section 6, to execute successive sequence calculation. These calculated results are stored at predetermined addresses in the memory section 6 in sequence (in step 402). After the processing of step 402 for all the sequence circuits has been completed, CPU 1 reads the calculated results from the memory section 6 and transfers these to the output section 4 as an output data table (in step 403). By performing the above three steps 401 to 403 as one cycle, the press machine 30 operates in such a sequence that the feed-in cylinder 33 operates to move a workpiece 32 to a predetermined position on the table B; the press cylinder 34 operates to press the workpiece 32; and the feed-out cylinder 35 operates to move the workpiece 32 from the table B.

As described above, in the prior-art sequence control system, the sequential operations of the cylinders 33 to 35 are controlled in sequence by cyclically updating the input data table indicative of input data from the limit switches LS1 to LS6 and the output data table indicative of output data to the solenoid valves SV1 to SV3.

However, in the above-mentioned prior-art sequence control system, since the input data table and the output data table are cyclically rewritten, in case the sequence operation stops in the manufacturing line for some reason or other, even if it is apparent that a cause of trouble exists in the input system, it has been difficult to promptly locate a trouble spot of the input system which produces abnormal data.

In other words, in these cases, since the operator must find an abnormal spot on the basis of stop status at the manufacturing line and with reference to the sequence circuit diagram, there exists a problem in that it takes much time to troubleshoot the abnormal spot, and therefore the line operation rate (machine availability factor) is reduced.

The operation of the sequence control system of the third modification will be described with reference to a flowchart for reading reference data shown in FIG. 13(A), a flowchart for an automatic operation shown in FIG. 13(B), a flowchart for trouble diagnosis shown in FIG. 13(C), a timing chart showing the expansion and contraction operation of various cylinders 33 to 35 shown in FIG. 12(C), and a sequence circuit stored in the memory section 6 shown in FIG. 12(D).

Figure 13A:
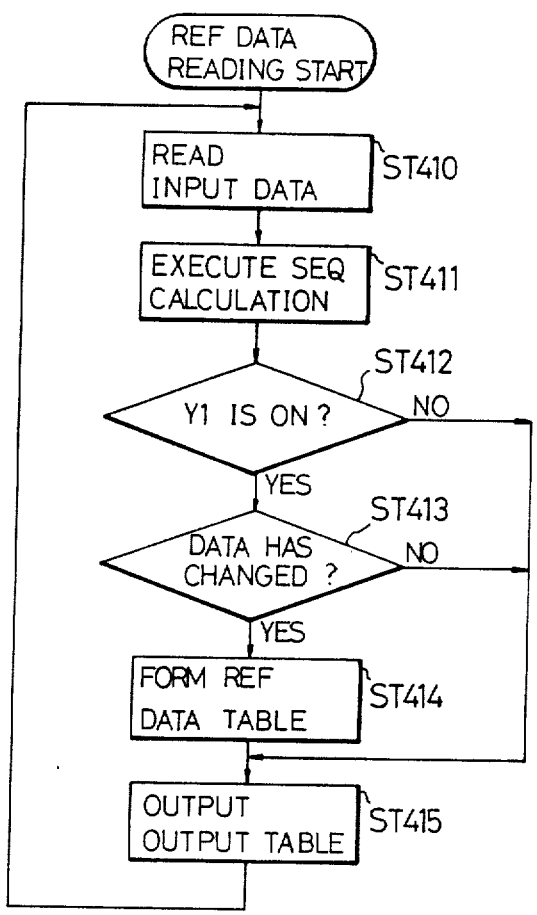
FIGS. 13(A) to 13(C) are flowcharts for assistance in explaining the operation of the third modification of the sequence control method of the present invention.
Figure 13B:
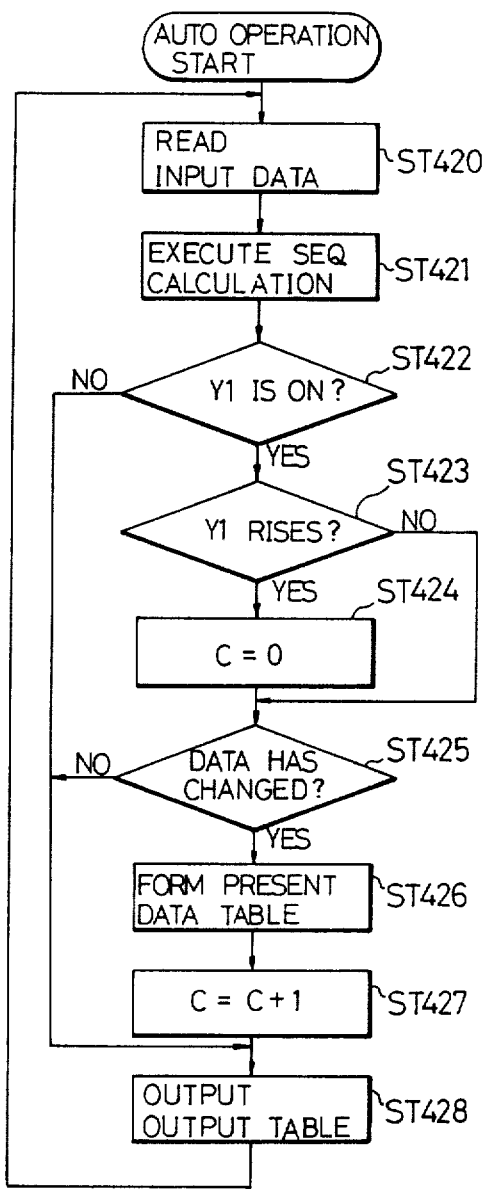
Figure 13C:
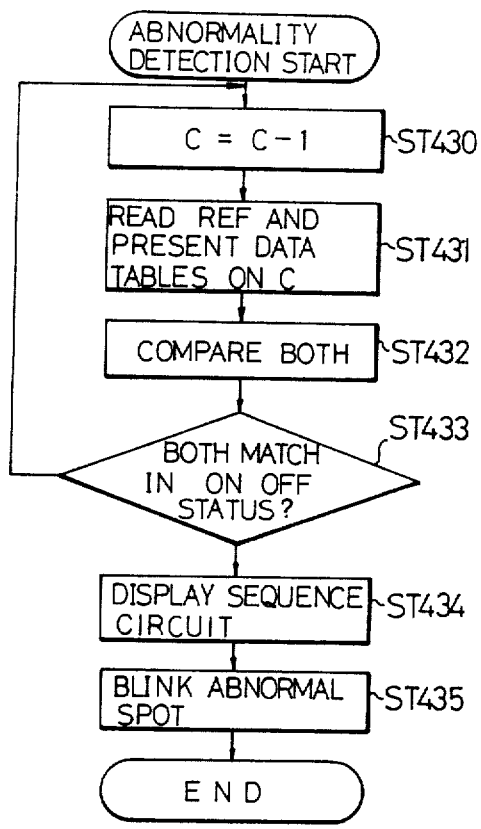

First, the reference data are read as follows:

In FIG. 13(A), input data indicative of open/close status of each contact of a main switch SW and the limit switches LS1 to LS6 are read to the CPU 1 via the input section 3, and written at predetermined address in the first memory section 6 as an input data table (in step 410). CPU 1 reads values one-to-one corresponding to the sequence circuit shown in FIG. 12(D) step by step, with reference to the input data table stored in the first memory section 6, to execute successive sequence calculation. These calculated results are stored at predetermined addresses in the first memory section 6 in sequence (in step 411). After the processing of step 411 for all the sequence circuits has been completed, CPU 1 checks whether previously designated internal coil data indicative of cyclic operation (e.g. an internal coil data Y1 in FIG. 12(D) is turned on) (in step 412).

If the internal coil data Y1 is not turned on, CPU proceeds to step 415; if turned on; that is, if during cyclic operation, CPU 1 compares the input/output data during the present cyclic operation with those during the preceding cyclic operation to check change between the two (in step 413). If no data change is determined, CPU proceeds to the step 415; if a data change is determined, CPU stores the on/off status of the present cycle input/output data at predetermined addresses of the second memory section 6 as reference data tables (in step 414). That is, in step 414, reference data tables indicative of on/off status of the input/output data are formed whenever input/output data change. CPU 1 reads output data tables from the first memory section 6 and transfers them to the output section 4 (in step 415). After one cycle from step 410 to step 415 has been completed, CPU returns to the step 410 to repeat the same steps. As described above, the reference data tables are formed for all the steps of the sequence circuit and stored in the second memory section 421, thus preparing an automatic line operation.

The automatic operation of the sequence control system will be described with reference to FIG. 13(B).

First, input data indicative of open/close status of each contact of a main switch SW and the limit switches LS1 to LS6 are read to the CPU 1 via the input section 3, and written at predetermined address in the first memory section 6 as an input data table (in step 420). CPU 1 reads values one-to-one corresponding to the sequence circuit shown in FIG. 13(D) step by step, with reference to the input data table stored in the first memory section 6, to execute successive sequence calculation. These calculated results are stored at predetermined addresses in the first memory section 6 in sequence (in step 421). After the processing of step 421 for all the sequence circuits has been completed, CPU 1 checks whether previously designated internal coil data indicative of cyclic operation (e.g. an internal coil data Y1 in FIG. 13(D) is turned on) (in step 422).

If the internal coil data Y1 is not turned on, CPU proceeds to step 428; if turned on; that is, if during cyclic operation, CPU 1 checks whether this turning-on is a leading edge of the internal coil data Y1 (in step 423). That is, in this step 423, CPU determines whether the present cycle is the first cycle of the automatic operation. Further, this internal coil data Y1 is turned off whenever a series of sequence operations end, and turned on whenever the sequence operations start.

If the present turning-on is not determined as a leading edge of the internal coil data Y1 (in step 423). CPU proceeds to the step 425; if determined as a leading edge of the internal coil data Y1; that is, the current cycle is a first cycle of the automatic operation, CPU sets the count value CT of a counter (not shown) to zero and initializes addresses at which the counted value CT is written (in step 424). That is, in this step 424, the count value CT of the counter is cleared to match the number of the output data table to that of the reference data table in order to obtain a head of the output data table. Further, in this case, the preceding input/output data are cleared.

Therefore, CPU 1 compares the input/output data in the present cycle with those in the previous cycle to check a change between the two cycles (in step 425). If data do not change, CPU precedes to step 428; if data change, CPU 1 stores the on/off status of the input/output data in the present cycle at predetermined addresses in the second memory section 6 as the present data table (in step 426). That is, in this step 426, the present data tables indicative of on/off status of the input/output data are formed whenever the input/output data change.

CPU 1 increments the counted value CT of the counter (in step 427), reads the output data tables from the first memory section 420 and transfers them to the output section 4 (in step 428). After one cycle from step 420 to step 428 has been completed, CPU returns to the step 420 again to repeat the same cycle.

The trouble diagnosis operation of the sequence control system when the manufacturing line stops will be described with reference to FIG. 13(C).

Assumption is made that the manufacturing line stops due to abnormal data from the input system. In this case, since the counter value exceeds a reference time, the operator decrements the counter value CT by operating the keyboard (not shown) of the programming device 8. In response to this operation, CPU 1 decrements the counter value CT (in step 430). CPU reads the reference data table at this counted time CT and the present data table from the second memory section 7 (in step 431). CPU compares the on/off status of the reference data table with those of the present data table (in step 432) and checks whether there are input data whose on/off status is different between the two (in step 433). If no input data whose on/off status is different exist; that is, no abnormal input data exist, CPU returns to the step 430 to repeat the same steps. If input data whose on/off status is different exists; that is, abnormal input data exist, CPU 1 finds a step of the sequence circuit belonging to the abnormal input data and displays this step on a CRT display (not shown) of the programming device 8. Further, CPU compares the on/off status of data switched in relation to the on/off status of the abnormal input data with the corresponding data in the reference data table to display different data on the CRT display in blinking manner (in step 435).

The operation of the sequence control system at line stop will be explained by taking the case where an internal coil Y4 of the sequence circuit shown in FIG. 12(D) develops trouble as an example. In this case, the on/off status of the present various input data obtained when abnormality occurs and the on/off status of the various input data from the reference data table at that time are read for comparison. CPU 1 detects that the present on/off status of the internal coil Y4 is different from the reference values and displays the sequence circuit belonging to the internal coil Y4 on the CRT display. Further, CPU 1 compares the on/off status of the contact Y4 of the internal coil Y4 with the reference status, and displays the contact Y4 different from the reference status on the CRT display in blinking manner. Therefore, the operator can know the cause of the line stop promptly, thus averting drop in line operation availability.

As described above, since the retrieving means reads on/off status of the input system from both the present status storing means and the reference status storing means to retrieve the input system in which on/off status is different, it is possible to promptly detect an abnormal spot in the input system, thus averting a drop of operation rate of manufacturing lines.

Further, in the present invention, since the present status storing means stores on/off status of the input data and therefore time change in on/off status of the sequence circuit can be known, it is possible to effectively utilize the present invention to debugging for correcting trouble in the sequence circuit such as mismatching of operation timing.

Figure 14:
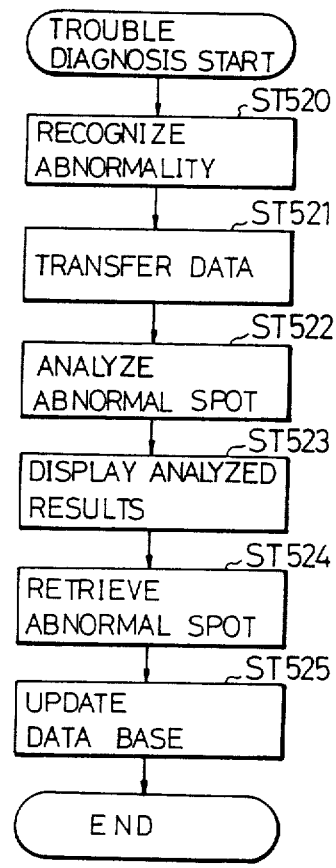
FIG. 14 is a flowchart for assistance in explaining the operation of the fourth modification of the sequence control method of the present invention.

With reference to FIGS. 12(B) and 14, a fourth modification of the sequence control system and the method according to the present invention will be described hereinbelow. In this fourth modification, the system is further provided with a self-diagnosis function for analyzing abnormal spots with reference to past abnormal data stored in a data base.

In comparison, the operation of the prior-art sequence control system which does not includes the second memory 7 will be explained with reference to a flowchart shown in FIG. 12(B).

That is, first the ladder sequence circuit regarded as being related to abnormal signals under consideration of each section status at manufacturing line stop is displayed on a CRT display of the programming device 8 (in step 510). Next, the operator confirms the on/off status of the input system such as internal coils, relay contacts, limit switches, etc. at each step by observing the CRT display (in step 511). When no abnormal spot can be located in step 511, the operator returns to the step 510 to repeat the same step (in step 512). As described above since the operator must find an abnormal spot on the basis of step status at the manufacturing line and with reference to the sequence circuit diagram, there exists a problem in that this requires much skill and it takes much time to troubleshoot the abnormal spot, and therefore the line operation availability is reduced.

With reference to FIG. 11, the sequence control system of the fourth modification comprises a personal computer 20 to which a data base 21 as data reserving means is connected via a communication cable is connected to the CPU 1 via another communication cable.

The operation of the trouble diagnosis apparatus of the sequence control system constructed as described above will be explained with reference to a flowchart shown in FIG. 14.

First, assumption is made that the manufacturing line stops due to abnormal data of the input system. When CPU 1 recognizes an abnormality (in step 521), on/off status of the input/output data at the step where abnormality occurs are transferred to the computer 20 via the second communication cable (in step 522). To allow the computer 20 to recognize an occurrence of abnormality, the operator enters an abnormality signal through the keyboard into the sequence control system. Or else, it is possible to automatically check an occurrence of abnormality by storing reference on/off input status data in the computer and comparing present on/off input data with the reference ones.

Thereafter, the operator operates the computer 20 to analyze the current abnormal spots on the basis of an abnormal step number, abnormal on/off status of input/output data entered and past abnormal step numbers, past abnormal on/off status of input/output data stored in the data base 21 (in step 523). The analyzed results are displayed on the CRT display (in step 524).

On the other hand, with reference to the analyzed results, the operator retrieves the current abnormal spot by use of the programming apparatus 8 (in step 525) and enters the current abnormal step number, the current abnormal spot corresponding to the on/off status of the input/output data at the current abnormal step, and transfers these data from the computer 20 to the data base 21 via the communication cable to update the data base 21 (in step 526).

In the above embodiment, a personal computer is shown as analyzing means, however, any terminal device can be used which can transfer data to the data base.

What is claimed is:

1. A sequence control system for controlling a plurality of processes in sequence, each process being achieved by actuating an actuation member in forward and reverse directions, said sequence control system comprising:
    (a) forward side executing means for executing a forward process by driving at least one actuation member in a forward direction;
    (b) forward side actuating means for actuating said forward side executing means;
    (c) forward side stopping means for stopping said forward side executing means;
    (d) reverse side executing means for executing a reverse process by driving at least one actuation member in a reverse direction;
    (e) reverse side actuating means for actuating said reverse side executing means;
    (f) reverse side stopping means for stopping said reverse side executing means;
    (g) actuation start side activating means, coupled to said forward side actuating means and to said reverse side stopping means and activated when said reverse side stopping means is turned on, for causing said forward side executing means to be activated when said forward side actuating means is turned on; and
    (h) actuation end side activating means, coupled to said forward side stopping means and to said reverse side actuating means and activated when said forward side stopping means is turned on, for causing said reverse side executing means to be activated when said reverse side actuating means is turned on, said actuation start side activating means for a present process and said actuation end side activating means for a preceding process being activated simultaneously when one of said actuation start side activating means for said present process and said actuation end side activating means for said preceding process is activated.

2. The sequence control system of claim 1 which further comprises:
    (a) means for activating only said actuation end side activation means for said present process without activating said activation start side activating means for a succeeding process, before using said forward side executing means for said present process and activating said actuation start side activating means for said succeeding process only when said forward side stopping means is turned on, when only said actuation end side activating means for said present process is kept activated due to failure of said forward side stopping means and said reverse side actuation means is turned on, said forward side executing means being stopped and said reverse side executing means being actuated for repair; and
    (b) means for activating only said actuation start side activation means for said present process without activating said activation end side activating means for a succeeding process, before using said reverse side executing means for said present process, and activating said actuation end side activating means for said preceding process, and activating said actuation end side activating means for said preceding process only when said reverse side stopping means is turned on, when only said actuation start side activating means for said present process is kept activated due to failure of said reverse side stopping means and said forward side actuating means is turned on, said reverse side executing means being stopped and said forward side executing means being actuated for repair.

3. The sequence control system of claim 1, which further comprises:
 (a) forward side execution time measuring means, activated when said forward side actuating means is turned on and deactivated when said forward side stopping means is turned on, for measuring a forward side processing time of said forward side executing means;
 (b) reverse side execution time measuring means, activated when said reverse side actuating means is turned on and deactivated when said reverse side stopping means is turned on, for measuring a reverse side processing time of said reverse side executing means;
 (c) execution time storing means for storing reference forward and reverse side processing times of said forward and reverse side executing means, respectively; and
 (d) comparing means, coupled to said forward and reverse side time measuring means and to said execution time storing means, for comparing forward and reverse processing times measured by said forward and reverse side time measuring means with reference to forward and reverse side processing times, respectively for checking whether said forward and reverse side actuating means operate normally.

4. The sequence control system of claim 1, which further comprises:
 (a) present status storing means for storing present input data to said sequence control system;
 (b) reference status storing means for storing reference input data obtained when an object to be controlled operates in accordance with a predetermined sequence control; and
 (c) retrieving means, coupled to said present status and reference status storing means, for reading present input data from said present status storing means and reference input data from said reference status storing means when said object to be controlled will not operate in accordance with said predetermined sequence control, and retrieving in abnormal input control process step not in accordance with said predetermined sequence control on the basis of a difference between read present input data and stored reference input data.

5. The sequence control system of claim 1, which further comprises:
 (a) data reserving means for reserving data related to at least one of an abnormal past control process step not in accordance with a predetermined sequence control, abnormal past step numbers, and abnormal past input data; and
 (b) data analyzing means for analyzing said abnormal past control process step not in accordance with said predetermined sequence control by comparing present input data with data reserved in said data reserving means when an object to be controlled will not operate in accordance with said predetermined sequence control.

6. A sequence control method, comprising the steps of:
 (a) checking whether an actuation start side activating unit for a present process is activated;
 (b) if said actuation start side activating unit for said present process is activated, activating an actuation end side activating unit for a preceding process;
 (c) checking again whether said actuation start side activating unit for said present process is activated;
 (d) if said actuation start side activating unit for said present process is not activated, ending control;
 (e) if said actuation start side activating unit for said present process is activated, checking whether a forward side executing unit can be activated;
 (f) if said forward side executing unit cannot be activated, repeating above steps (c) to (e);
 (g) if said forward side executing unit can be activated, inactivating said actuation end side activating unit for said preceding process;
 (h) inactivating said actuation start side activating means unit for said present process;
 (i) executing a process utilizing a forward side executing unit;
 (j) checking whether said forward side executing unit can be stopped;
 (k) if said forward side executing unit cannot be stopped, repeating above steps (i) and (j); and
 (l) if said forward side executing unit can be stopped, activating an actuation end side activating unit for said present process and an actuation start side activating unit for a succeeding process, simultaneously.

7. A sequence control method of claim 6, which further comprises the steps of:
 (a) checking whether said actuation end side activating unit for said present process is activated;
 (b) if said actuation end side activating unit is activated, activating said actuation start side activating unit for said succeeding process;
 (c) checking again whether said actuation end side activating unit for said present process is activated;
 (d) if said actuation end side activating unit is not activated, ending a program loop control;
 (e) if said actuation end side activating unit is activated, checking whether a reverse side executing unit can be activated;
 (f) if said reverse side executing unit cannot be activated, repeating above steps (c) to (e);
 (g) if said reverse side executing unit cannot be activated, inactivating said actuation start side activating unit for said succeeding process;
 (h) inactivating said actuation end side activating unit for said present process;
 (i) executing a process with said reverse side executing unit;
 (j) checking whether said reverse side executing unit can be stopped;
 (k) if said reverse side executing unit cannot be stopped, repeating above steps (i) and (j); and
 (l) if said reverse side executing unit can be stopped, activating said actuation start side activating unit for said present process and said actuation end side activating means unit for said preceding process, simultaneously.

8. The sequence control method of claim 7, which further comprises the steps of:
(a) activating only said actuation end side activating unit for said present process after step (h) of claim 6;
(b) executing a process with said forward side executing unit;
(c) checking whether said forward side executing unit can be stopped;
(d) if said forward side executing unit cannot be stopped, repeating above steps (b) and (c);
(e) if said forward side executing unit can be stopped, activating said actuation start side activating unit;
(f) checking whether only said actuation end side activating unit is still activated;
(g) if only said actuation end side activating unit is still activated, checking whether said reverse side actuating unit can be actuated;
(h) if said reveres side actuating unit cannot be actuated, ending program loop control;
(i) if said reverse side actuating unit can be actuated, stopping said forward side executing unit; and
(j) returning to step (g) of claim 7.

9. The sequence control method of claim 7, which further comprises the steps of:
(a) activating only said actuation start side activating unit for said present process after step (h) of claim 7;
(b) executing a process with said reverse side executing unit;
(c) checking whether said reverse side executing unit can be stopped;
(d) if said reverse side executing unit cannot be stopped, repeating above steps (b) and (c);
(e) if said reverse side executing unit can be stopped, activating said actuation end side activating unit;
(f) checking whether only said actuation start side activating unit is still activated;
(g) if only said actuation start side activating unit is still activated, checking whether said forward side actuating unit can be actuated;
(h) if said forward side actuating unit cannot be actuated, ending program loop control;
(i) if said forward side actuating unit can be actuated, stopping said reverse side executing unit; and
(j) returning to step (g) of claim 6.

10. The sequence control method of claim 6, which further comprises the steps of:
(a) activating a first timer when said forward side executing unit is activated in step (i) of claim 6;
(b) deactivating said first timer when said forward side stopping unit is activated in step (1) of claim 6 to measure a first processing time of said forward side executing unit;
(c) comparing said first measured time with a reference time to determine whether said forward side execution means operates in accordance with a predetermined sequence control.

11. The sequence control method of claim 7, which further comprises the steps of:
(a) activating a second timer when said reverse side executing unit is activated in step (i) of claim 7.
(b) deactivating said second timer when said reverse side stopping unit is activated in step (1) of claim 7 to measure a processing time of said reverse side executing unit;
(c) comparing said second measured time with a reference time to determine whether said reverse side executing unit operates in accordance with a predetermined sequence control.

12. The sequence control method of claim 6, which further comprises the steps of:
(a) reading and writing data outputted from a controlled object operating in accordance with a predetermined sequence control;
(b) forming and storing a reference data table for each step on the basis of data outputted from said controlled object operating in accordance with said predetermined sequence control;
(c) reading and writing data outputted from a controlled object now operating;
(d) forming and storing a present data table for each step;
(e) reading said stored reference data table and said present data table for each step;
(f) comparing said present data table with said stored reference data table;
(g) if present data do not match stored reference data, displaying a sequence circuit and indicating an abnormal control process step.

13. The sequence control method of claim 6, which further comprises the steps of:
(a) storing past data outputted from a controlled object not operating in accordance with a predetermined sequence control for each step;
(b) reading present data outputted from said controlled object not operating in accordance with said predetermined sequence control at a step;
(c) analyzing a control process step not in accordance with said predetermined sequence control by comparing present data with past data, both not in accordance with said predetermined sequence control;
(d) displaying analyzed results on a display unit;
(e) retrieving a present control process step not in accordance with said predetermined sequence control; and
(f) updating stored past data not in accordance with said predetermined sequence control.

* * * * *